United States Patent
Ignatius et al.

(10) Patent No.: US 7,209,972 B1
(45) Date of Patent: Apr. 24, 2007

(54) HIGH SPEED DATA TRANSFER MECHANISM

(75) Inventors: Paul Ignatius, Jackson, NJ (US); Anand Prahlad, East Brunswick, NJ (US); Varghese Devassy, Mississauga (CA); Mahesh Tyagarajan, San Jose, CA (US); Robert Wu, Belford, NJ (US); Shankar R. Iyer, Mississuaga (CA)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 09/495,751

(22) Filed: Feb. 1, 2000

Related U.S. Application Data

(63) Continuation-in-part of application No. 09/038,440, filed on Mar. 11, 1998.

(60) Provisional application No. 60/063,831, filed on Oct. 30, 1997.

(51) Int. Cl.
G06F 15/16 (2006.01)

(52) U.S. Cl. .................. 709/231; 709/232; 370/431

(58) Field of Classification Search ................ 709/217, 709/232, 240, 201–203, 208, 211, 213, 231; 712/16; 370/431
See application file for complete search history.

(56) References Cited

U.S. PATENT DOCUMENTS

| | | | |
|---|---|---|---|
| 4,296,465 A | * | 10/1981 | Lemak .................. 710/316 |
| 4,686,620 A | | 8/1987 | Ng |
| 4,995,035 A | | 2/1991 | Cole et al. |
| 5,005,122 A | | 4/1991 | Griffin et al. |
| 5,093,912 A | | 3/1992 | Dong et al. |
| 5,133,065 A | | 7/1992 | Cheffetz et al. |
| 5,193,154 A | | 3/1993 | Kitajima et al. |
| 5,212,772 A | | 5/1993 | Masters |
| 5,226,157 A | | 7/1993 | Nakano et al. |
| 5,239,647 A | | 8/1993 | Anglin et al. |
| 5,241,668 A | | 8/1993 | Eastridge et al. |
| 5,241,670 A | | 8/1993 | Eastridge et al. |

(Continued)

FOREIGN PATENT DOCUMENTS

EP   0 259 912   3/1988

(Continued)

OTHER PUBLICATIONS

PCT International Search Report for Application No. PCT/US01/02931, Mar. 6, 2002.*

(Continued)

*Primary Examiner*—Ario Etienne
*Assistant Examiner*—LaShonda Jacobs
(74) *Attorney, Agent, or Firm*—Knobbe, Martens, Olson & Bear, LLP

(57) ABSTRACT

A storage and data management system establishes a data transfer pipeline between an application and a storage media using a source data mover and a destination data mover. The data movers are modular software entities which compartmentalize the differences between operating systems and media types. In addition, they independently interact to perform encryption, compression, etc., based on the content of a file as it is being communicated through the pipeline. Headers and chunking of data occurs when beneficial without the application ever having to be aware. Faster access times and storage mapping offer enhanced user interaction.

20 Claims, 17 Drawing Sheets

U.S. PATENT DOCUMENTS

| | | | |
|---|---|---|---|
| 5,276,860 | A | 1/1994 | Fortier et al. |
| 5,276,867 | A | 1/1994 | Kenley et al. |
| 5,287,500 | A | 2/1994 | Stoppani, Jr. |
| 5,301,351 | A * | 4/1994 | Jippo ............... 709/233 |
| 5,333,315 | A | 7/1994 | Saether et al. |
| 5,347,653 | A | 9/1994 | Flynn et al. |
| 5,410,700 | A | 4/1995 | Fecteau et al. |
| 5,448,724 | A | 9/1995 | Hayashi |
| 5,495,607 | A | 2/1996 | Pisello et al. |
| 5,504,873 | A | 4/1996 | Martin et al. |
| 5,544,345 | A | 8/1996 | Carpenter et al. |
| 5,544,347 | A * | 8/1996 | Yanai et al. ............ 711/162 |
| 5,559,957 | A * | 9/1996 | Balk .................... 714/23 |
| 5,619,644 | A * | 4/1997 | Crockett et al. .......... 714/45 |
| 5,638,509 | A | 6/1997 | Dunphy et al. |
| 5,673,381 | A | 9/1997 | Huai et al. |
| 5,675,511 | A * | 10/1997 | Prasad et al. ........... 715/500.1 |
| 5,682,513 | A * | 10/1997 | Candelaria et al. ........ 711/113 |
| 5,699,361 | A | 12/1997 | Ding et al. |
| 5,719,786 | A * | 2/1998 | Nelson et al. ............ 709/219 |
| 5,729,743 | A | 3/1998 | Squibb |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,805,920 | A * | 9/1998 | Sprenkle et al. ........... 710/1 |
| 5,812,398 | A | 9/1998 | Nielsen |
| 5,813,017 | A | 9/1998 | Morris |
| 5,875,478 | A | 2/1999 | Blumenau |
| 5,887,134 | A * | 3/1999 | Ebrahim ............... 709/200 |
| 5,901,327 | A | 5/1999 | Ofek |
| 5,924,102 | A | 7/1999 | Perks |
| 5,933,104 | A * | 8/1999 | Kimura ................ 341/87 |
| 5,950,205 | A | 9/1999 | Aviani, Jr. |
| 5,956,519 | A | 9/1999 | Wise et al. |
| 5,970,233 | A * | 10/1999 | Liu et al. .............. 709/246 |
| 5,974,563 | A | 10/1999 | Beeler, Jr. |
| 5,995,091 | A * | 11/1999 | Near et al. ............. 715/500.1 |
| 6,003,089 | A * | 12/1999 | Shaffer et al. ............ 709/233 |
| 6,021,415 | A | 2/2000 | Cannon et al. |
| 6,026,414 | A | 2/2000 | Anglin |
| 6,052,735 | A | 4/2000 | Ulrich et al. |
| 6,076,148 | A | 6/2000 | Kedem |
| 6,094,416 | A | 7/2000 | Ying |
| 6,094,684 | A * | 7/2000 | Pallmann ............... 709/227 |
| 6,105,129 | A * | 8/2000 | Meier et al. ............. 712/222 |
| 6,122,668 | A * | 9/2000 | Teng et al. ............. 709/231 |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,167,402 | A | 12/2000 | Yeager |
| 6,212,512 | B1 | 4/2001 | Barney et al. |
| 6,260,069 | B1 | 7/2001 | Anglin |
| 6,269,431 | B1 * | 7/2001 | Dunham |
| 6,275,953 | B1 * | 8/2001 | Vahalia et al. ........... 714/11 |
| 6,301,592 | B1 | 10/2001 | Aoyama et al. |
| 6,324,581 | B1 * | 11/2001 | Xu et al. ............... 709/229 |
| 6,328,766 | B1 | 12/2001 | Long |
| 6,330,570 | B1 | 12/2001 | Crighton |
| 6,330,642 | B1 | 12/2001 | Carteau |
| 6,343,324 | B1 | 1/2002 | Hubis et al. |
| RE37,601 | E | 3/2002 | Eastridge et al. |
| 6,356,801 | B1 | 3/2002 | Goodman et al. |
| 6,389,432 | B1 | 5/2002 | Pothapragada et al. |
| 6,421,711 | B1 | 7/2002 | Blumenau et al. |
| 6,487,561 | B1 | 11/2002 | Ofek et al. |
| 6,519,679 | B2 | 2/2003 | Devireddy et al. |
| 6,538,669 | B1 | 3/2003 | Lagueux, Jr. et al. |
| 6,564,228 | B1 | 5/2003 | O'Connor |
| 6,604,149 | B1 * | 8/2003 | Deo et al. .............. 709/247 |
| 6,654,825 | B2 * | 11/2003 | Clapp et al. ............. 710/60 |
| 2002/0004883 | A1 | 1/2002 | Nguyen et al. |

FOREIGN PATENT DOCUMENTS

| EP | 0 405 926 | | 1/1991 |
|---|---|---|---|
| EP | 0 467 546 | | 1/1992 |
| EP | 0 774 715 | | 5/1997 |
| EP | 0 809 184 | | 11/1997 |
| EP | 0 862 304 | * | 9/1998 |
| EP | 0 899 662 | | 3/1999 |
| EP | 0 981 090 | | 2/2000 |
| WO | 95/13580 | | 5/1995 |
| WO | WO 98/39707 | * | 9/1998 |
| WO | 95/12098 | | 3/1999 |

OTHER PUBLICATIONS

PCT International Search Report for Application No. PCT/US01/02931, Mar. 6, 2002.

Armstead et al., "Implementation of a Campus-wide Distributed Mass Storage Service: The Dream vs. Reality," *IEEE*, 1995, pp. 190-199.

Arneson, "Mass Storage Archiving in Network Environments," *IEEE*, 1998, pp. 45-50.

Cabrera et al., "ADSM: A Mutli-Platform, Scalable, Backup and Archive Mass Storage System," *Digest of Papers of the Computer Society Conference, IEEE* Comp. Soc. Press, Vol. Conf. (Mar. 5, 1995), pp. 420-427.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structure File System," *Operating Systems Review SIGOPS*, vol. 25, No. 5, New York, US, pp. 1-15 (May 1991).

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and the recitation in claim 5).

* cited by examiner

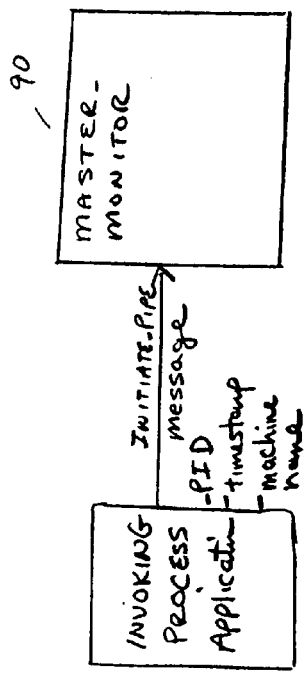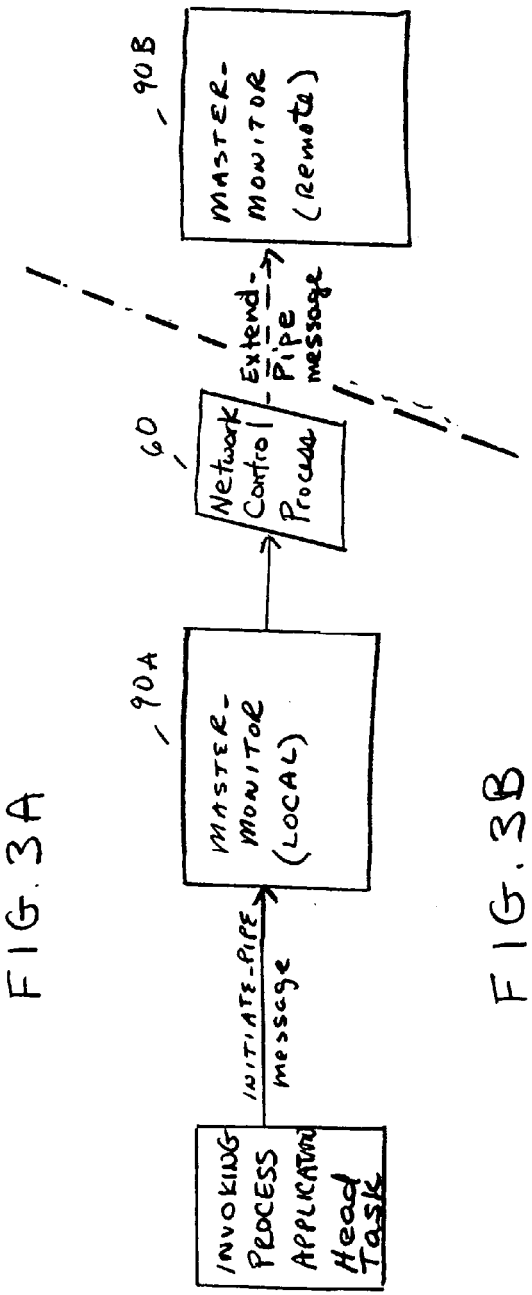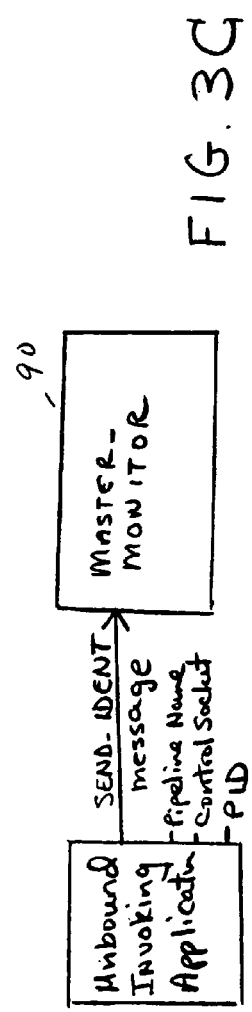

HIGH SPEED DATA TRANSFER MECHANISM

RELATED APPLICATIONS

This application is a continuation in part of U.S. patent application Ser. No. 09/038,440, filed Mar. 11, 1998, which is based on U.S. Provisional Application No. 60/063,831, filed on Oct. 30, 1997.

FIELD OF THE INVENTION

The invention relates to data transfer mechanisms, and in particular, to a software-based, high speed DataPipe for providing high speed and reliable data transfer between computers.

BACKGROUND OF THE INVENTION

It is fairly obvious that data, in the process of being archived or transferred from one location to another, will pass through various phases where different operations such as compression, network transfer, storage, etc. will take place on it. There are essentially two approaches that can be taken when implementing such a transfer mechanism. One would be to split the archival process into sub-tasks, each of which would perform a specific function (e.g. Compression). This would then require copying of data between sub-tasks, which could prove processor intensive. The other method would be to minimize copies, and have a monolithic program performing all of the archival functions. The downside to this would be loss of parallelism. A third alternative would of course be to use threads to do these tasks and use thread-signaling protocols, however, it is realized that this would not be entirely practical since threads are not fully supported on many computing platforms.

Accordingly, it is highly desirable to obtain a high-speed data transfer mechanism implemented in software and developed for the needs of high speed and reliable data transfer between computers.

It is an object of the invention to disclose the implementation of the DataPipe in accordance with CommVault System's Vault98 backup and recovery product. While developing the DataPipe, it is assumed that data, as it moves from archiving source (backup client) to archiving destination (backup server as opposed to media), may undergo transformation or examination at various stages in between. This may be to accommodate various actions such as data compression, indexing, object wrapping etc. that need to be performed on data being archived. Another assumption is the data may be transmitted over the network to remote machines or transferred to a locally attached media for archival.

Both the sending and the receiving computers execute software referred to herein as the DataPipe. Although the DataPipe transfer mechanism to be described herein is operative as a key component of backup and recovery software product schemes, the DataPipe is not restricted to that use. It is a general purpose data transfer mechanism implemented in software that is capable of moving data over a network between a sending and a receiving computer at very high speeds and in a manner that allows full utilization of one or more network paths and the full utilization of network bandwidth. A DataPipe can also be used to move data from one storage device to another within a single computer without the use of a network. Thus, the DataPipe concept is not confined to implementation only in networked systems, but is operable to transfer data in non-networked computers as well.

SUMMARY OF THE INVENTION

It is an object of the invention to provide in a communications system having an origination storage device and a destination storage device, a data transfer pipeline apparatus for transferring data in a sequence of N stages, where N is a positive integer greater than 1, from the origination to the destination storage device. The apparatus comprises dedicated memory having a predetermined number of buffers dedicated for carrying data associated with the transfer of data from the origination device or process to the destination device or process; and master control module for registering and controlling processes associated with the data transfer apparatus for participation in the N stage data transfer sequence. The processes include at least a first stage process for initiating the data transfer and a last Nth stage process for completing data transfer. The first stage process is operative to allocate a buffer from the predetermined number of buffers available within the dedicated memory for collection, processing, and sending of the data from the origination device to a next stage process. The last Nth stage process is operative to receive a buffer allocated to the first stage process from the (N−1)th stage process in the data transfer sequence and to free the buffer upon processing completion and storage in the destination device to permit reallocation of the buffer. The master control process further includes a means for monitoring the number of buffers from the pool of buffers allocated or assigned to particular processes in the pipeline, wherein the monitor means is operative to prevent allocation of further buffers to a particular process when the number of buffers currently allocated exceeds a predetermined threshold.

DESCRIPTION OF THE DRAWINGS

The invention will be better understood with reference to the following drawings, in which:

FIGS. 3A–3C illustrate various messages transferred between application processes and the master monitor process according to an embodiment of the invention.

DETAILED DESCRIPTION

Figure 1:
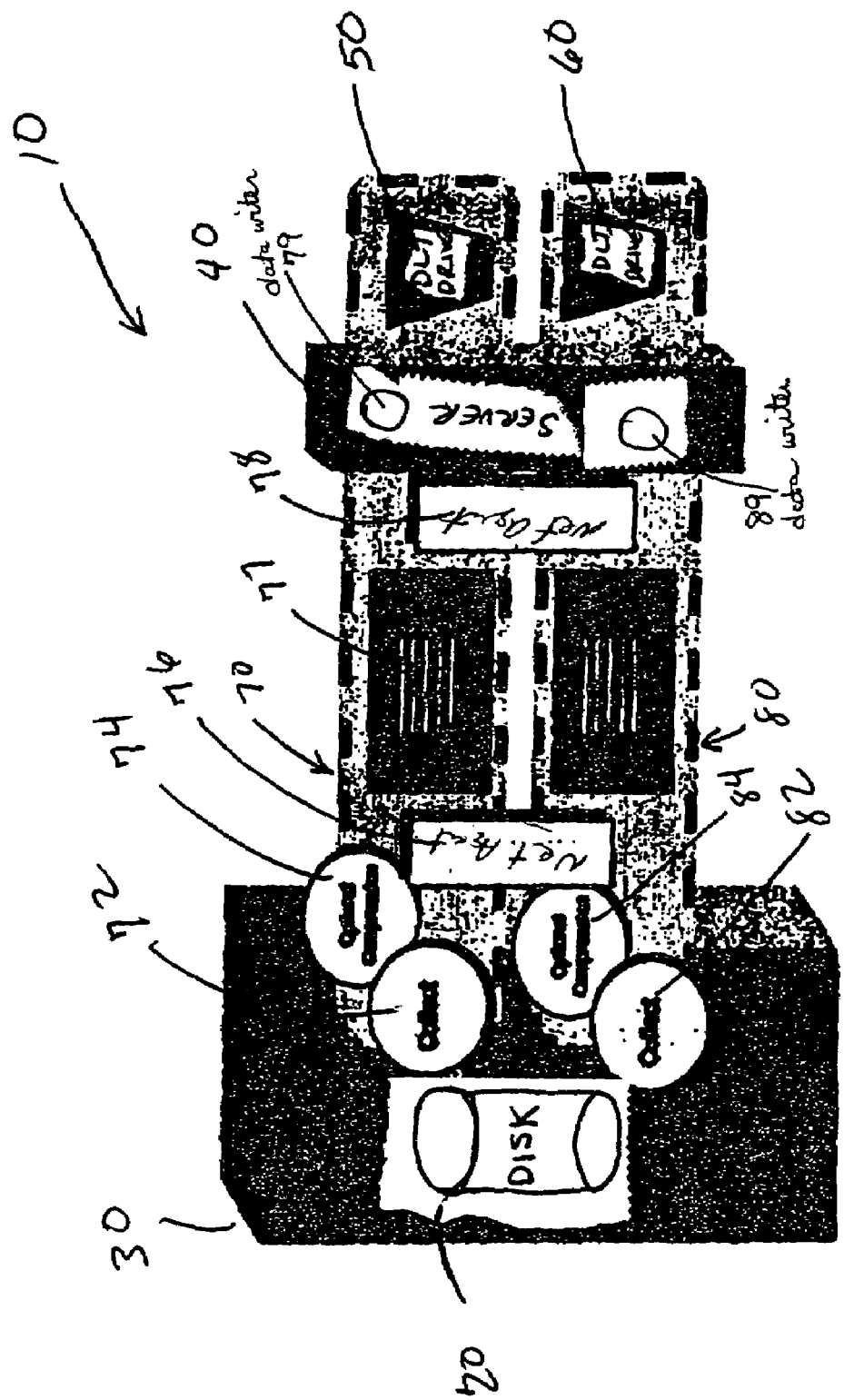
FIG. 1 is a block diagram of the DataPipe architecture in accordance with the present invention.

Before embarking on a detailed discussion of the data transfer mechanism of the present invention, the following should be understood. The objective of the DataPipe according to the present invention is to move data as quickly as possible from point A to point B (which may be on the same or different computers within a network) while performing a variety of operations (compression, encryption, content analysis, etc.) on the data. In order to meet this objective, parallel processing must be fully exploited, network bandwidth must be fully utilized, and CPU cycles must be minimized. The DataPipe must be efficiently implemented on a wide variety of computer systems such that heterogeneous systems on a network can use a DataPipe to transfer data to each other.

A DataPipe comprises a named set of tasks executing within one or more computers that cooperate with each other to transfer and process data in a pipelined manner. Within a DataPipe, a pipeline concept is used to improve performance of data transfer across multiple computers in a network. However, within a DataPipe, any stage within the pipeline may have multiple instances, thus greatly increasing the scaleability and performance of the basic pipeline concept.

The DataPipe mechanism processes data by dividing its processing into logical tasks that can be performed in parallel. It then sequences those tasks in the order in which they are to act on the data. For example, a head task may extract data from a database, a second task may encrypt it, a third may compress it, a fourth may send it out over the network, a fifth may receive it from the network, and a sixth may write it to a tape. The latter two tasks may reside on a different computer than the others, for example.

All of the tasks that comprise a single DataPipe on a given computer have access to a segment of shared memory that is divided into a number of buffers. A small set of buffer manipulation primitives is used to allocate, free, and transfer buffers between tasks.

Semaphores (or other OS specific mutual exclusion or signaling primitives) are used to coordinate access to buffers between tasks on a given computer. Special tasks, called network agents, send and receive data across network connections using standard network protocols. These agents enable a DataPipe to connect across multiple computer systems. A single DataPipe can therefore reside on more than one computer and could reside on computers of different types.

Each task may be implemented as a separate thread, process, or as a procedure depending on the capabilities of the computing system on which the DataPipe is implemented.

The data exchange paradigm called the DataPipe has been fashioned to provide solutions to the problems associated and encountered in prior art data transfer systems. The salient features of this method are as follows:

1. Split the whole task of processing on data into logical sub tasks and sequence them according to the order in which they are supposed to act on the data stream.
2. Use dedicated process/threads to perform network transfer.
3. Make all the dedicated tasks share a single large shared memory segment.
4. Split the shared memory segment into small buffers so that this single buffer space can be shared among various execution threads at various stages of tasks.
5. Use semaphores (or other OS specific mutual exclusion or signaling primitives) to transfer control over the data segments between modules.

As mentioned previously, each task may be implemented as a separate thread, or process, or as a procedure in a monolithic process (in cases where native platforms don't support any forms of parallel execution or multi processing). For data transfer across network, dedicated network readers and writers ensure communication across the net. FIG. 1 shows a steady state picture of how the DataPipe architecture 10 is set up according to the present invention.

Referring to FIG. 1, there is shown a disk 20 residing on a computer machine 30 such as a SUN MICROSYSTEMS INC., SPARCSTATION 2, which houses information or data to be backed up or archived to server computer 40 (which may be for instance a SPARC 10) via optical or DLT devices 50 and 60 respectively. As one can ascertain, the DataPipe represents the end-to-end architecture which may be utilized during database backup from the disk drive 20 where the database will be archived to the tape or optical devices 50 and 60 at server 40. The DataPipe thus removes the network as the limiting factor in backup performance. As a result, the device pool defines the performance capabilities.

As shown in FIG. 1, the DataPipe or stream 70 is created for the transfer of data for each device in the device pool to be used simultaneously, which comprises modules 72, 74, 76, 78, 79 and 50. Similarly, a second DataPipe 80 is shown comprised of modules 82, 84, 76, 78, 89 and 60. Note that if additional archive devices are used to backup data and parallel further DataPipes would be provided. Since one can ascertain the concept of the DataPipe through explanation of one path or thread by which data is transferred, further description will focus on processing through a single DataPipe or stream 70, as shown in FIG. 1. At the head of the DataPipe is the collector component 72 which is responsible for obtaining the database information from disk 20. The data is passed down in buffers residing in dedicated shared memory (e.g. RAM memory) through the pipeline 70, through an optional compression module 74, to the network interface modules 76. At the network interface, data is multiplexed and parallel network paths 77 obtain maximum throughput across the network. The network may be, for example, the well-known Ethernet, or any network capable of supporting TCP/IP protocols including FDDI or ATM networks. The number of network paths utilized for each stream is a configurable parameter determined by the bandwidth of the network and configurable via a user interface. Note that as higher performance levels are necessary, additional devices may be used simultaneously with additional network interfaces added and utilized to further increase network throughput. On the receiving side, from the database server 40, the device pull appears local to the machine and the DataPipe architecture appears as a cloud with no constraints to performance. Network interface module 78 operates to transfer the data received across the network to device 50 for storage at server 40. Thus, the final task of storing or archiving the data is accomplished at archive device module 50.

Figure 2A:
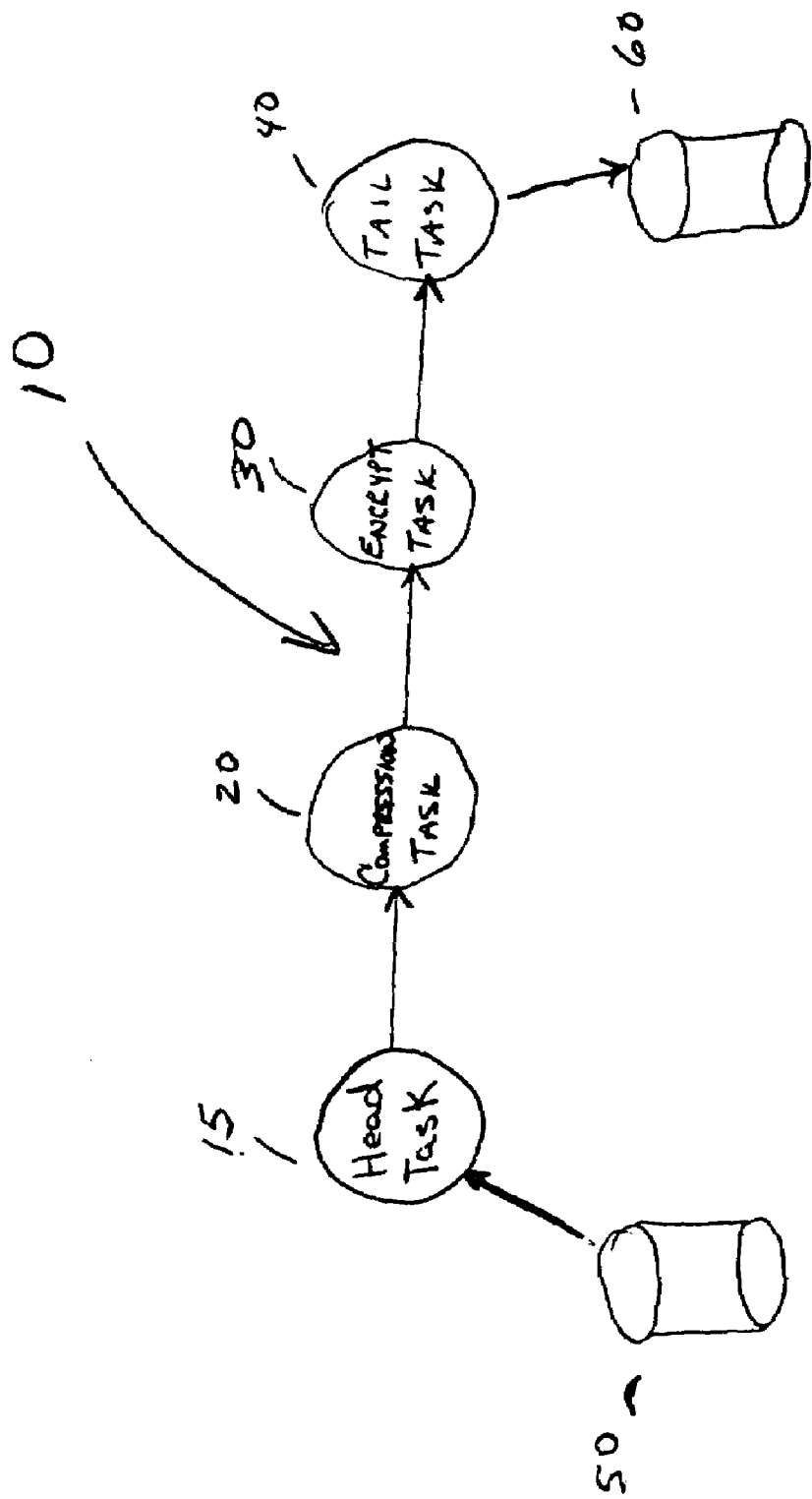
FIG. 2A is a schematic of the DataPipe transfer process on a single computer according to an embodiment of the invention.

From the preceding discussion and FIG. 2A, one can ascertain that a pipeline or DataPipe 10 comprises a head task 15 that generates the data to be archived or transferred from store 50, and a tail task 40 which accomplishes the final task of storing or writing the data to store 60, including archiving or restoring on the data. One or more middle modules 20, 30 may exist, which processes the data by performing actions such as compression, encryption, content analysis, etc. by allocating or not allocating new buffers while doing the processing.

Figure 2B:
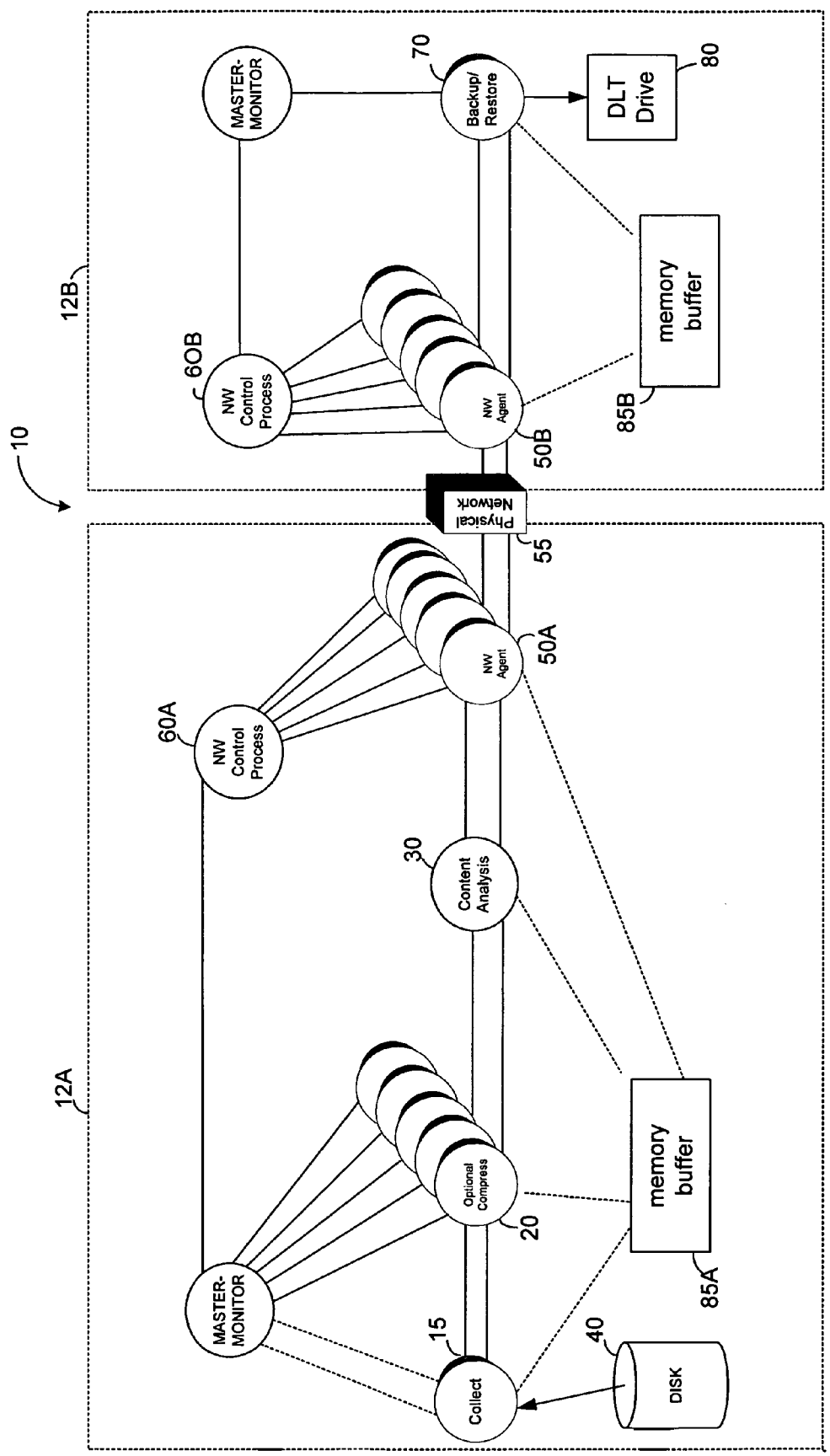
FIG. 2B is a schematic of the DataPipe transfer process on multiple computers according to another embodiment of the invention.

A pipeline on a particular machine can be arranged to provide a feed to another different machine. A schematic diagram is illustrated in FIG. 2B. In this case, the DataPipe resides on more than one computer. This is done with the aid of network agents and control processors 50A, 50B, 60A and 60B. In such cases, the first machine 12A has a head 15 and other modules 20, 30, etc. which comprise middle processes. A cluster of dedicated network agents 50A which send data across to the remote machine 12B via standard network protocols and act as a pseudotail on the first machine. On the remote machine, a cluster of dedicated network reader agents 50B act as a pseudo head, and along with other modules such as middle (not shown) and tail 70, constitute the pipeline segment on that machine.

In addition to the transferring of data from one computer to another, a unique capability of the datapipe invention is the ability to scale to enable full utilization of the bandwidth of a network, and to fully utilize the number of peripheral devices such as tape drives, or fully utilize other hardware components such as CPUs. The scaleability of a DataPipe is achieved by using multiple instances of each task in the pipeline.

For example, multiple head tasks operating in parallel may gather data from a database and deposit it into buffers. Those buffers may then be processed by several parallel tasks that perform a function such as encryption. The encryption tasks in turn may feed several parallel tasks to perform compression, and several parallel tasks may perform network send operations to fully exploit network bandwidth. On the target computer, several network reader tasks may receive data, which is written to multiple tape units by several tasks. All of these tasks on both computers are part of the same DataPipe and collectively perform the job of moving data from the database to tape units. They do this job extremely efficiently by fully utilizing all available bandwidth and hardware allocated to the DataPipe while also minimizing CPU cycles by avoiding unnecessary copying of the data as it moves from one stage of the DataPipe to the next.

FIG. 2B shows the multiple computer case where a single head task (collect process) gathers data from the disk 40 and deposits it into buffers. The buffers are then processed by several parallel instantiations of compression process 20 which upon completion of processing of each buffer for each instantiation sends the process buffer to process 30 which performs content analysis, and sends the processed buffer data to several network agent tasks 50A or instantiations, which perform the network operations to send the data over the physical network 55 where it is received and processed by corresponding network agents 50B on the remote computer 12B and sent to tail backup/restore process 70 for storage or writing to DLT drive 80.

In general, there could be N stages in a given DataPipe pipeline. At each stage of the pipeline, there could be p instances of a given module task. These N stages could all be on the local machine or could be split across two different machines in which case there are network writers and network readers (i.e. pseudo tail and head network agents) which work together to ensure continuity in the pipeline.

Referring to FIG. 2B, each DataPipe has a dedicated memory segment 85 on each machine on which the DataPipe resides. For example, a DataPipe that sends data from machine 12A to machine 12B has two dedicated memory segments, one on machine A and one on machine B. Tasks that are part of this DataPipe may allocate and free buffers within these memory segments. Of course, tasks operating on machine 12A may only allocate or free buffers within the memory segment 85 on machine A and likewise for tasks on machine B. Thus, any of these modules may allocate or free segments of a single large shared memory on each machine dedicated for the use of this particular pipeline.

Buffer Manipulation Primitives

Figure 2C:
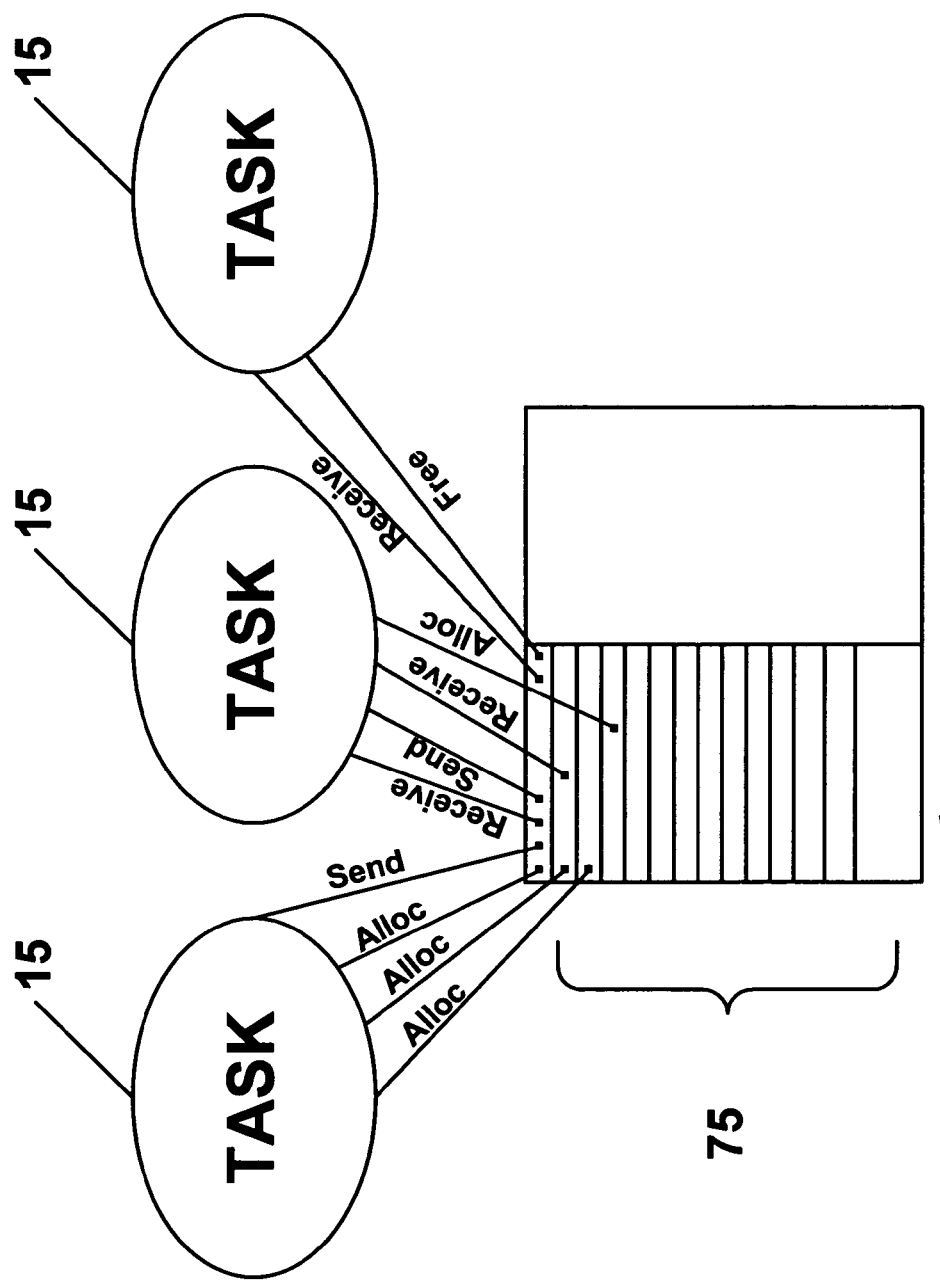
FIG. 2C is a schematic of the DataPipe transfer buffer allocation process from a buffer pool stored in the shared memory according to an embodiment of the invention.

Referring now to FIG. 2C, each task or process (15) that wishes to allocate a buffer does it from a buffer pool 75 stored in the shared memory segment 85 owned by the DataPipe using AllocBuf( ). Each task that wishes to process incoming data from the previous task executes a receive call using ReceiveBuf( ). Each task that wishes to relinquish control of a particular buffer so that the next task can operate on it, performs a SendBuf( ) on that buffer to send it to the next task. Each task that wishes to destroy a buffer and return it into the buffer pool, does so by executing a FreeBuf( ) on that buffer.

Master_Monitor is connected to a predefined port, to enable it to communicate with its peers on other computer systems. Master_Monitor monitors the status of all DataPipes under its control at all times and is able to provide status of the DataPipe to the application software that uses the DataPipe.

Figure 2D:
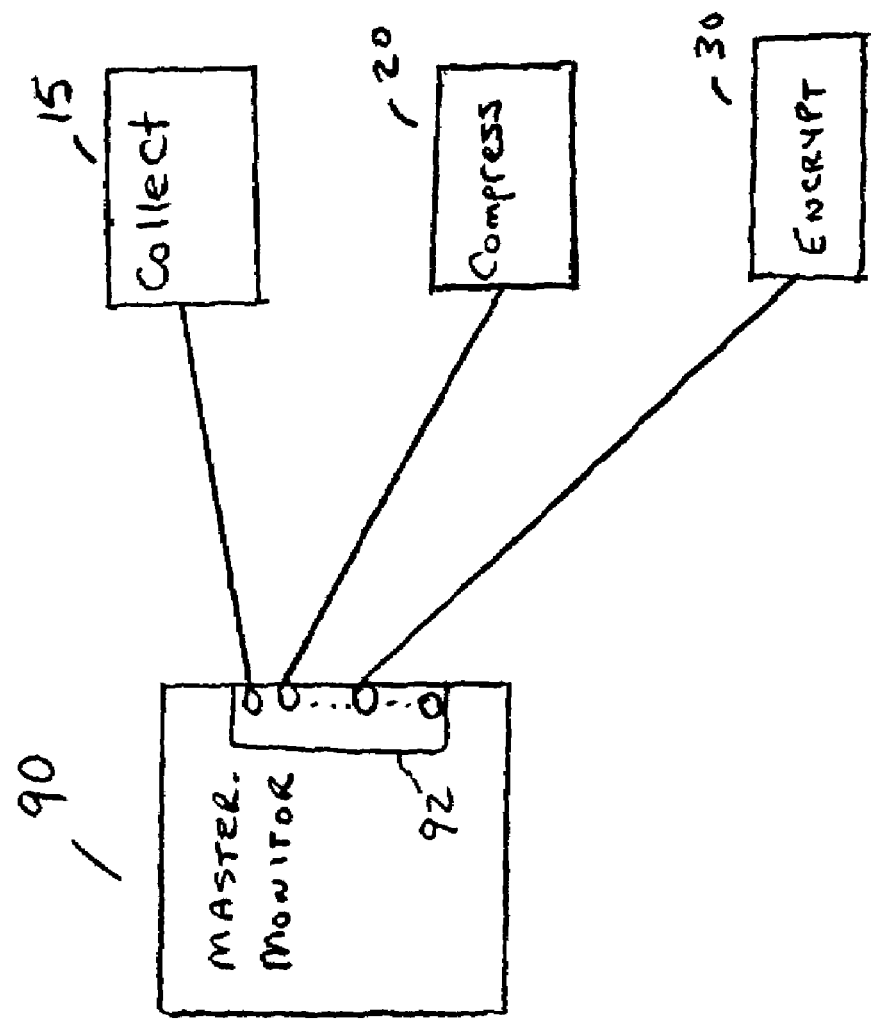
FIG. 2D is a schematic illustrating the controlling relationship of the master monitor process to the various attached processes according to an embodiment of the invention.

To accomplish these above tasks, a master manager program called Master_Monitor executes in the preferred embodiment as a daemon on all process machines. The Master_Monitor program "listens" or receives control signal data on a port dedicated to receiving such control data from external processes. In this manner, the Master_Monitor program can serve the requirements of pipeline operations. Master_Monitor functions to monitor status of all pipelines under its control at all times and reports status of the pipeline to all its sub-modules. As shown in FIG. 2D, Master_Monitor includes control messaging sockets 92 open to all modules through which it can control or change status of execution of each module. Master_Monitor 90 further includes functions which monitor status and listings of all centrally shared resources (among various modules of the same pipeline) such as shared memory or semaphores or any similar resource. Master_Monitor unless otherwise requested will initiate all modules of the pipeline either by fork( ) or thread_create( ) or a similar OS specific thread of control initiation mechanism. Master_Monitor also permits initiation of a pipeline with proper authentication. This initiator process can identify itself as either a head process or a tail process, which will later attach itself to the pipeline. (Exception is made in the case of a networking module, for this facility. A network process will not be allowed to attach itself as a head or tail of any pipeline.) The Master_Monitor daemon owns and controls the shared storage memory 85 shown in FIG. 2C and can thus permit or deny processes accessed to such memory.

DataPipe Initiation

Referring now to FIG. 3A in conjunction with FIGS. 1 and 2A–D, a DataPipe is created by calling Master_Monitor and passing it an Initiate_Pipe message. In this message, parameters such as the DataPipe name, DataPipe component module names, the number of parallel instances for each component, properties of each component (e.g. whether they allocate buffers or not), local and remote machines involved in the DataPipe, direction of flow, nature of the invocation program etc. are passed to Master_Monitor. Note that the term "module" refers to a program that is executed as a task as part of an instance of a DataPipe. Each module may have more than one instance (e.g. execute as more than one task) within a DataPipe.

Referring now to FIG. 3B, depending upon the nature of the invocation program, it may be required that the process invoking the DataPipe needs to identify itself to the local Master_Monitor 90A and attach itself to the DataPipe as a head or tail task. In order to operate over a network on two computers, the Master_Monitor 90 initiates a Network Controller Process 60 on the first machine which contacts Master_Monitor 90B on the second machine where this DataPipe is to be completed using an Extend Pipe message. All information required for establishing the second side of the DataPipe, (including DataPipe name, number of processes, local machine name and number of parallel instantiations of particular processes) is passed along with this call so that the DataPipe is completely established across both machines. The Master_Monitor 90B on the second or remote machine, in response initiates the required processes on the second machine including network control process 60B (see FIG. 2B) to initiate network agent processes on receiving machine.

Identification

The process responsible for initiation of the pipeline constructs a name for the pipeline using its own process Id, a time stamp, and the name of the machine where the initiator process is running. This pipeline name is passed along with both the Initiate-Pipe as well as the EXTEND_Pipe message so that the pipeline is identified with the same name on all computers on which it is operating (i.e. both the remote as well as the local machine). All shared memory segments and semaphores (reference numeral 85 of FIG. 2C) attached to a particular pipeline are name referenced with this pipeline name and definite offsets. Hence the process of identification of a specific semaphore or shared memory associated with this pipeline is easy and accessible for all processes, and bound modules (i.e., modules for which control is initiated by the Master_Monitor). Each unbound module (i.e., a module not initiated via Master_Monitor, which attaches itself after the pipeline is initiated) must identify itself to its local Master_Monitor via a SEND_IDENT message shown in FIG. 3C. This message contains the name of the pipeline the unbound module wants to attach itself to, a control socket, and a process/thread id, which Master_Monitor uses to monitor status of this particular module.

Data Transfer Implementation

Allocation: Receive: Send: Free

Directing attention to FIG. 2C and FIG. 4, buffers are allocated using the call AllocBuf( ), from a common pool of buffers specified in the dedicated shared memory for the particular pipeline. The pool consists of a single large shared memory space 75 with Max Buffers number of equally sized buffers and an 'rcq' structure. The 'rcq' structure illustrated in FIG. 4, contains input and output queues for each stage of the pipeline on that particular machine. Access to shared memory is controlled using a reader writer semaphore.

Figure 4A:
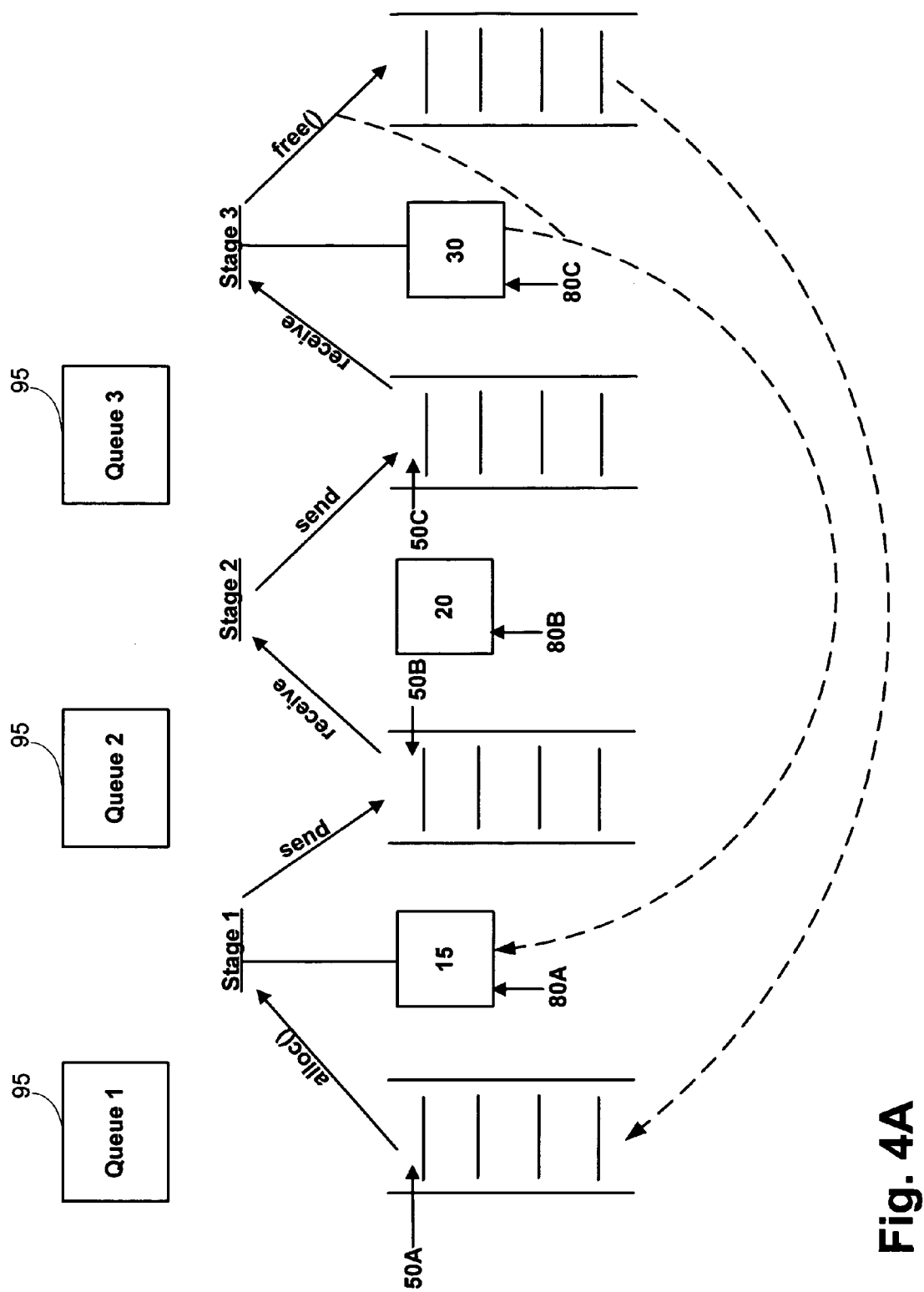
FIGS. 4A–4B illustrate schematics of the module attachment process to shared memory space in accordance with the present invention.

As shown in FIGS. 4A and B, the input queue of an ith stage module is the output queue of the (I−1)th stage module. The input queue of the first module is the output queue of the last module of the pipeline on that machine. Buffer allocation is always performed from the input queue associated with the first stage of the first module or process and a first set of semaphores 50A–C are each uniquely associated with a particular queue in order to track the number of buffers allocated by that queue/module. However, to ensure that no allocation task can unfairly consume buffers, a second set of semaphores 80 A–C is each uniquely associated with a particular module to limit allocation of buffers by each module to a threshold value of Max_Buffers/NA, where NA is the number of allocator modules in the pipeline on this particular machine. These parameters are stored in memory under control of the Master_Monitor program and determines whether any process has exceeded its allocation. This means there could be K unfreed buffers in the system allocated by a single instance of a module H, where K is Max_Buffers/NA. Further allocation by module H will be possible when a buffer allocated by H gets freed.

All FreeBuf( ) calls free their buffers into the input queue of the first module. By the same rule, first stage modules are never permitted to do a ReceiveBuf( ) but are permitted to do AllocBuf( ). On the other hand, tail processes are permitted to perform only FreeBuf( ) and never permitted to perform a SendBuf( ). All other modules can Receive, Allocate, Send, and Free buffers. First stage modules always perform SendBuf( ) after they execute each AllocBuf( ). Note: Any module in the pipeline can allocate an available buffer if it requires to copy data during processing. Normally, however, data is not recopied within a given machine's pipeline segment.

As previously mentioned, each queue 95 is associated with a semaphore 50 to guarantee orderly access to shared memory and which gets triggered upon actions such as AllocBuf( ), ReceiveBuf( ), SendBuf( ) and FreeBuf( ). A second set of semaphores 80, each associated with a particular module in the pipeline, provide a mechanism to ensure that no bottlenecks occur. Dedicated network agents thus map themselves across any network interface on the system, as long as data propagation is ensured. The number of network agents per pipeline is a configurable parameter, which helps this mechanism exploit maximum data transfer bandwidth available on the network over which it is operating. A single dedicated parent network thread/process monitors performance and status of all network agents on that particular machine for a particular pipeline.

Referring again to FIG. 4A, the process flow of buffer allocation, sending, receiving, and freeing of buffers by processes in the pipeline and their associated semaphore indices is now described. Upon allocation of a buffer by first stage module 15 via the AllocBuf( ) command, the value of semaphore 50A associated with queue 1 is decremented from an initial value $S_0$. Furthermore, second semaphore 80A which represents the allocator index for this particular module (module 15) which performs the allocation is also decremented from an initial value $S_1$. Information indicating the module which performed this allocation is included within each buffer. The module 15 then sends the buffer to queue 2 where it is received by module 20 via the command ReceiveBuf( ), taken off of input queue 2 and assigned to the module which performed the call (i.e. module 20). Upon completion of processing on this buffer, module 20 passes forward the buffer by means of the SendBuf( ) which forwards the buffer to the destination queue (queue 3). Module 30 then performs a ReceiveBuf( ) of the buffer on its input queue (i.e. queue 3) and upon processing of the data, performs a FreeBuf( ) operation. As part of the FreeBuf( ) operation, semaphore 50A associated with queue 1 is incremented. Similarly, semaphore 80A which is the allocator index of module 15 (i.e. the module who allocated this particular buffer) is also incremented. Information relevant to this operation is always available with the buffer with which one is performing the free operation by virtue of shared memory area 85. In the preferred embodiment, the first set of semaphores (50A–50C) associated with the input/output queues of a particular stage may have a threshold value of up to max_buffers which is indicative of the maximum number of buffers which can be allocated in the pipeline. However, the semaphores 80A–C each uniquely associated with a particular module of a particular stage has an associated value of only max_buffers/NA, where NA (number of allocators) is greater than or equal to 1. Accordingly, since the semaphore value for either semaphores 50A–C and 80A–C can not be less than 0, this insures that all allocator modules may obtain a fair share of the available total number of input buffer.

Figure 4B:
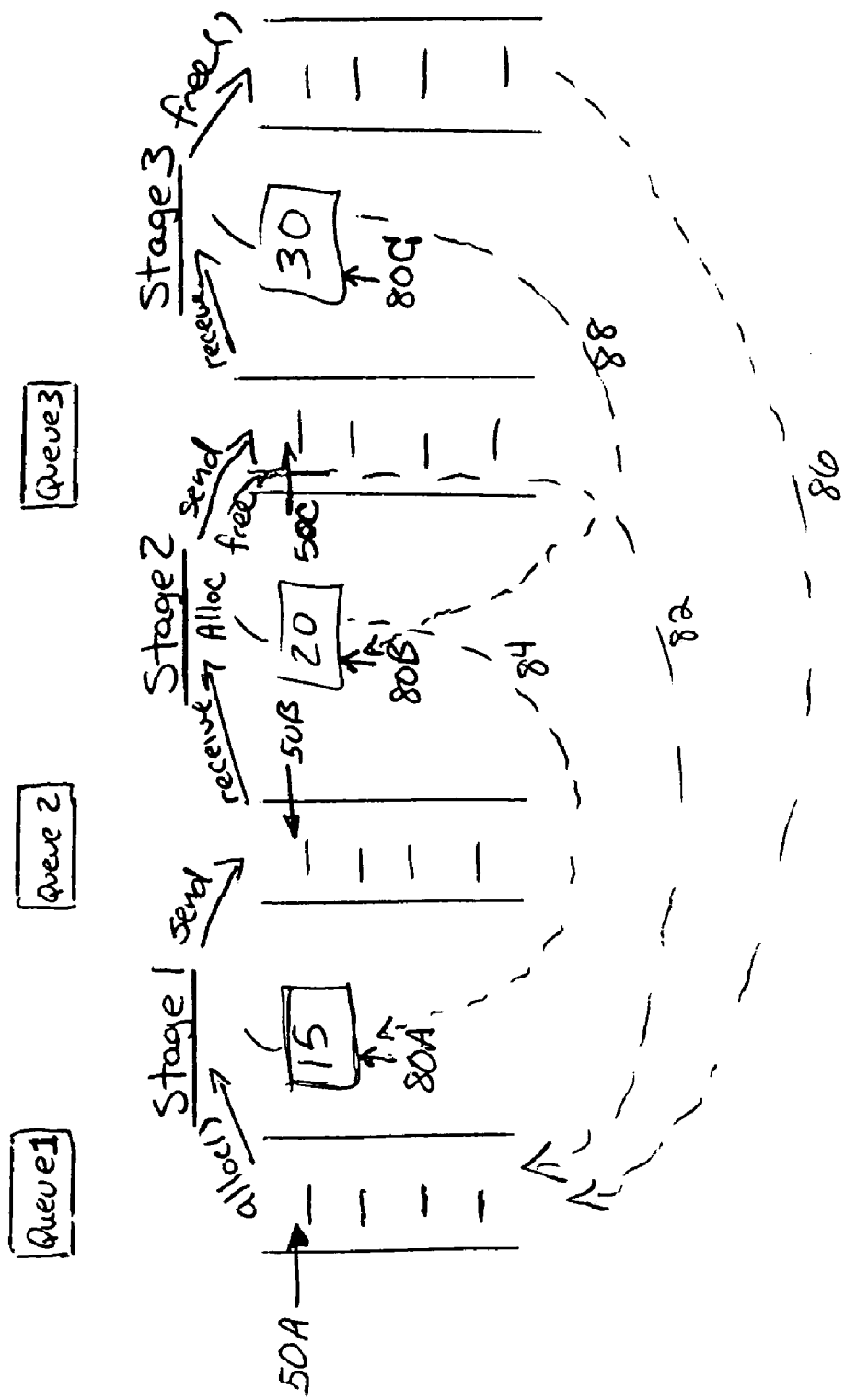

FIG. 4B illustrates the situation where at least two modules are operable to allocate buffers. Referring now to FIG. 4B, which is similar to FIG. 4A with the exception that both modules 15 and 20 are operable to allocate buffers, the following process is now described. Module 15 allocates the first buffer and decrements semaphore 50A. Similarly, semaphore 80A is also decremented. The buffer is then sent via the send command from module 15 from queue 1 to queue 2 where module 20 receives the buffer and begins processing. In this instance however, such as during compression, where a compression module may require allocation of additional buffers to perform its processing, module 20 performs an Alloc( ) to allocate a new buffer from the pool of available buffers in shared memory. Performance of the Alloc by module 20, thus causes semaphore 50A associated with queue 1, to be further decremented. Furthermore, the semaphore 80B associated with module 20 is also decremented, since module 20 is the allocator of the new buffer. Upon processing, the original buffer allocated by module 15 is freed via the FreeBuf( ) operation of module 20 at stage 2 and semaphore 50A value is correspondingly incremented, as indicated by arrow 82. In addition, module 20 increments semaphore 80A associated with module 15 as a result of performance of the FreeBuf( ) operation, as indicated by arrow 84. Module 20 then performs the SendBuf( ) to send the new buffer to module 30 at queue 3, where module 30 then receives the new buffer, performs its processing, and subsequently frees the buffer which increments semaphore 50A, as shown by arrow 86. As part of the FreeBuf( ) operation, module 30 also increments semaphore 80B associated with module 20 as shown by arrow 88. In this manner, any bottlenecks occurring within the pipeline are prevented, while maintaining proper and efficient data throughput.

Attachments

As the identification process is completed, all modules attach themselves to a specific shared memory space segment that is shared among modules on that machine for this particular pipeline. This shared memory segment has many data buffers, input queues for all stages on the pipeline, and their initial values. Each module identifies its own input queues and output queues depending on the stage that module is supposed to run at, and initial queue (first stage) is populated with number of data segments for sharing on this particular pipeline. Also all modules attach themselves to an allocator semaphore array, which controls the number of buffers allocated by a specific module that can be active in the pipeline.

Data Integrity

Figure 5B:
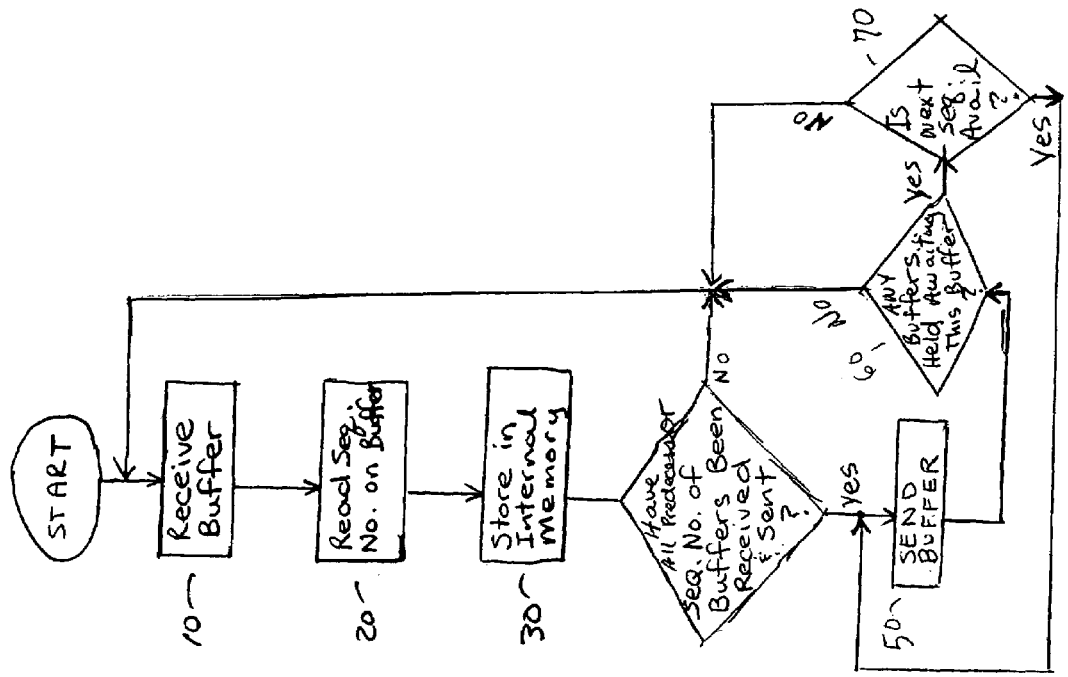
FIGS. 5A–5B depict flow diagrams of the operation of the sequencer and resequencer processes according to the present invention.
Figure 5A:
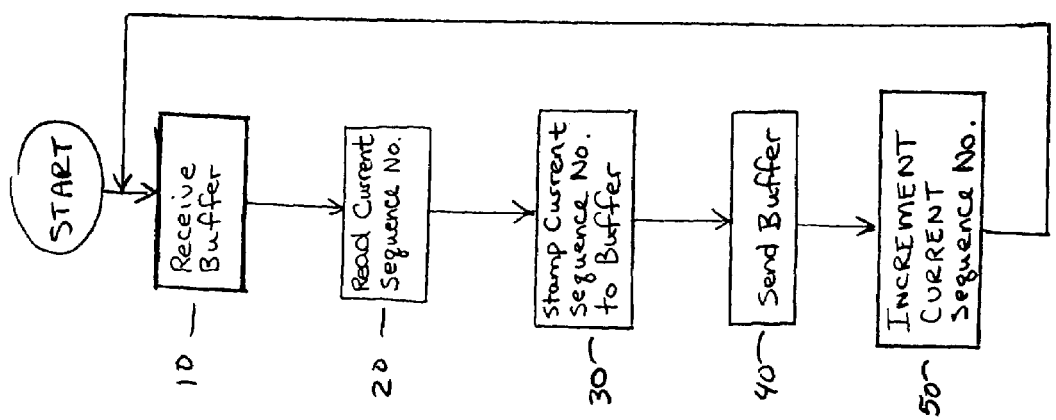

Integrity of the data passed along and the sequencing of data are maintained in part by a pair of special purpose modules termed sequencer and resequencer processes. FIGS. 5A and 5B provide diagrams of the operation of the sequencer and resequencer processes respectively. Referring to FIG. 5A, the sequencer process receives each buffer (module 10), reads the current sequence number stored in memory (module 20), and then stamps the buffer with the current sequence number (module 30) and sends the stamped buffer to the next stage for processing (module 40). The current sequence number is then incremented (module 50) and the process is repeated for each buffer received by the sequencer. The resequencer is operative to receive all input buffers and store them internally and wait for the required predecessor buffers to show up at the input queue before forwarding them all in the next sequence to the next stage of processing.

The purpose of the resequencer is to enforce the proper ordering of buffers. It insures this by making sure that it sends buffers to the next pipeline module in sequence number order. If a buffer is received out of order, it is held by the resequencer until all processor buffers are received and send to the next module. In this way, buffer ordering is guaranteed and buffers are never held longer than necessary. These steps are depicted in FIG. 5B. Note however, that when there is only one instance of a module present at any particular stage, by virtue of the queuing mechanism available with all input queues, data sequence in the right order is insured.

Hence, in the preferred embodiment, all data pipe transfers employing multi-instance stages via the sequencer/resequencer processes ensure that the input sequence of sequence numbers are not violated for each instance of the module. Further, the restriction that all modules of a specific multi-instance stage should be of the same type eliminates the chances for preferential behavior.

Fairness

The concept of fairness means that each task will be assured of getting the input buffers it needs to operate on without waiting longer than necessary. Fairness among the modules in a given DataPipe where no stage of the pipeline has more than one instance is automatic. As the tail task frees a buffer it enters the free buffer pool where it may enable the head task to allocate it and begin processing. All tasks in the DataPipe operate a maximum speed overlapping the processing done by other tasks int he preceding or following stage of the pipeline.

If a DataPipe has stages consisting of parallel instances of a task, fairness among those tasks is assured by using an allocator semaphore which counts from Max_Buffers/NA (where NA is the number of allocators for this DataPipe on this particular machine) downward to zero. All FreeBuf( )s increment this semaphore back, however, there could be only Max_Buffers/NA buffers allocated by any allocator module in this DataPipe. This ensures that all allocators get a fair share of the available total number of input buffers. If a particular process attempts to allocate more buffers than it is allowed, the master_monitor process prevents such allocation, causing the process to either terminate or wait until a buffer currently allocated to the process becomes freed thereby incrementing the semaphore back up to allow the process to allocate another buffer.

Control Messages

All instances of all modules have a control socket to Master_Monitor over which control messages are exchanged. All network readers/writers have an analogous control socket to their parent network agent. The parent network agent itself has a control socket to Master_Monitor. Each module periodically checks its control socket for any messages from Master_Monitor. Critical information such as a STOP_PIPE message is passed to Master_Monitor via this mechanism.

Status Monitoring

Each module initiated by Master_Monitor on a given machine is monitored by either a parent network process (in the case of network reader or writer), or by Master_Monitor itself, for states of execution. In case any module is reported as having terminated abnormally, Master_Monitor identifies this exception, and signals all the modules on that particular pipeline to stop. This is done by means of control messages through control sockets as described previously. Upon safely stopping all modules pertaining to this particular pipeline, it signals the remote machine's Master_Monitor to stop the remote side of this particular pipeline and the entire pipeline is shut down safely by means of control message signaling.

Implementation

In a preferred embodiment, the DataPipe functions and processes are implemented as software function in the higher level 'C' program language on Sun Solaris or HP-UX operating systems and incorporated into Release 2.7 of CommVault System's Vault98 storage management product.

Figure 6:
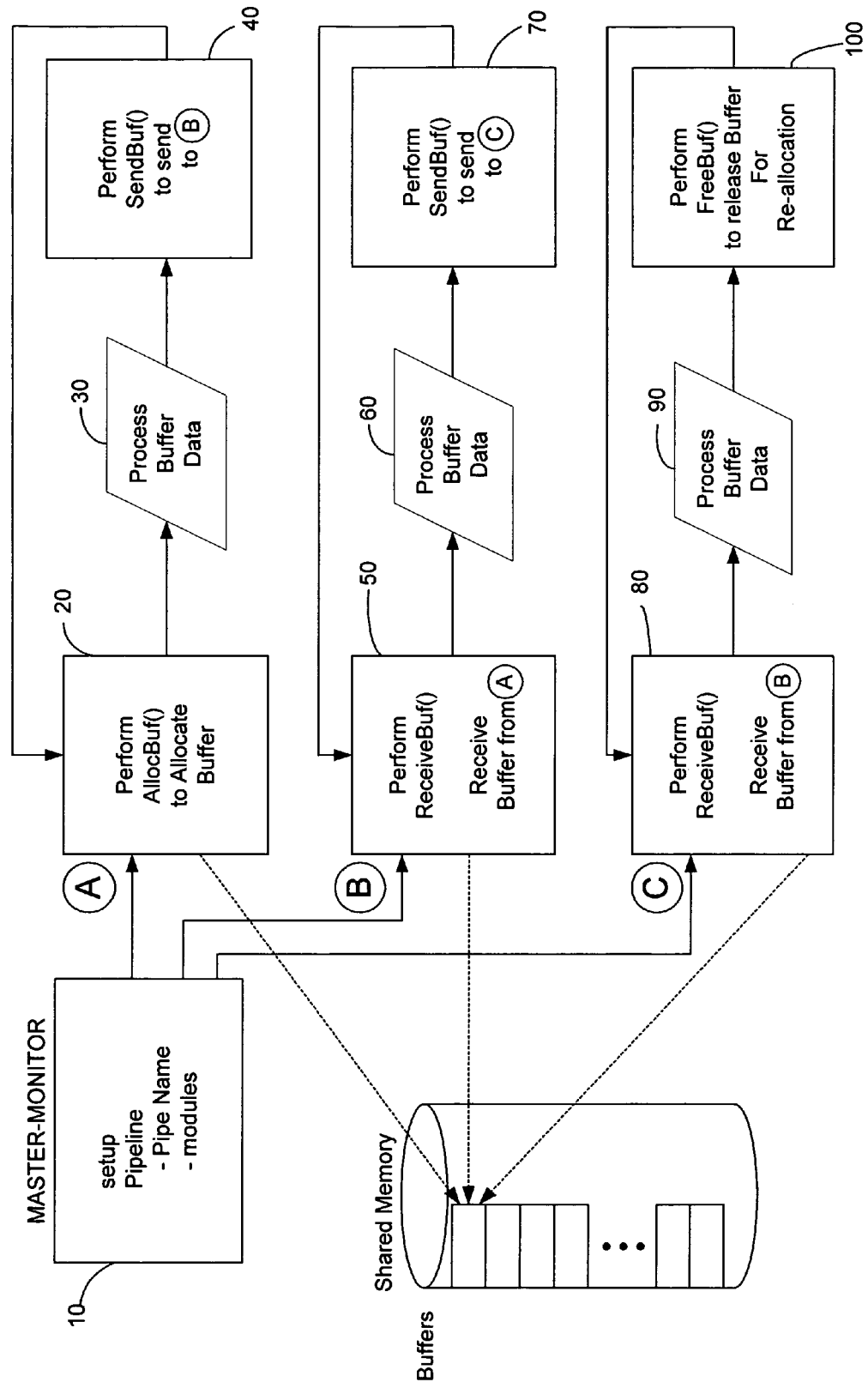
FIG. 6 depicts an exemplary data transfer flow among various processing stages within the DataPipe according to the present invention.

FIG. 6 is an illustrative example of the sequence of primitive commands used to set up a DataPipe. The DataPipe is then used to process data in three modules named A, B and C.

To set up the DataPipe the Master_Monitor is called and provided with the name of the DataPipe and the names of the modules that will use the pipe (module 10).

Master_Monitor (Initiate_Pipe(Sample_pipe,A,B,C)).

Within the logic of module A, Alloc_Buf( ) function is then called to obtain a buffer (20). The logic of module A may perform any actions it wants to fill the buffer with useful data. When it has completed its processing of the buffer (30), it calls SendBuf( ) to send the buffer to module B for processing (40). Module A then repeats its function by again calling Alloc_Buf( ) to obtain the next buffer.

The logic of module B calls ReceiveBuf( ) to obtain a buffer of data from module A (50). It then operates on the buffer by performing processing as required (60). When it is finished with the buffer it calls SendBuf( ) to send that buffer to module C (70).

Module B then repeats if function by again calling ReceiveBuf( ) to obtain the next buffer from module A.

Module C obtains a buffer of data from module B by calling ReceiveBuf( ) (80). When it has completed its processing of the data in that buffer (90), it calls FreeBuf( ) to release the buffer (100). Like the other two modules, it loops back to receive the next buffer form module B.

The primitives used to allocate, free, send, and receive buffers are synchronized by the use of semaphores. This ensures coordination between the modules so that the receiving module does not start processing data before the sending module has finished with it. If no buffer is available, the AllocBuf or ReceiveBuf primitives will wait until one is available. All three modules operate in parallel as separate tasks. The order of processing from A to B to C is established in the initial call to Master_Monitor that established the DataPipe.

Figure 7:
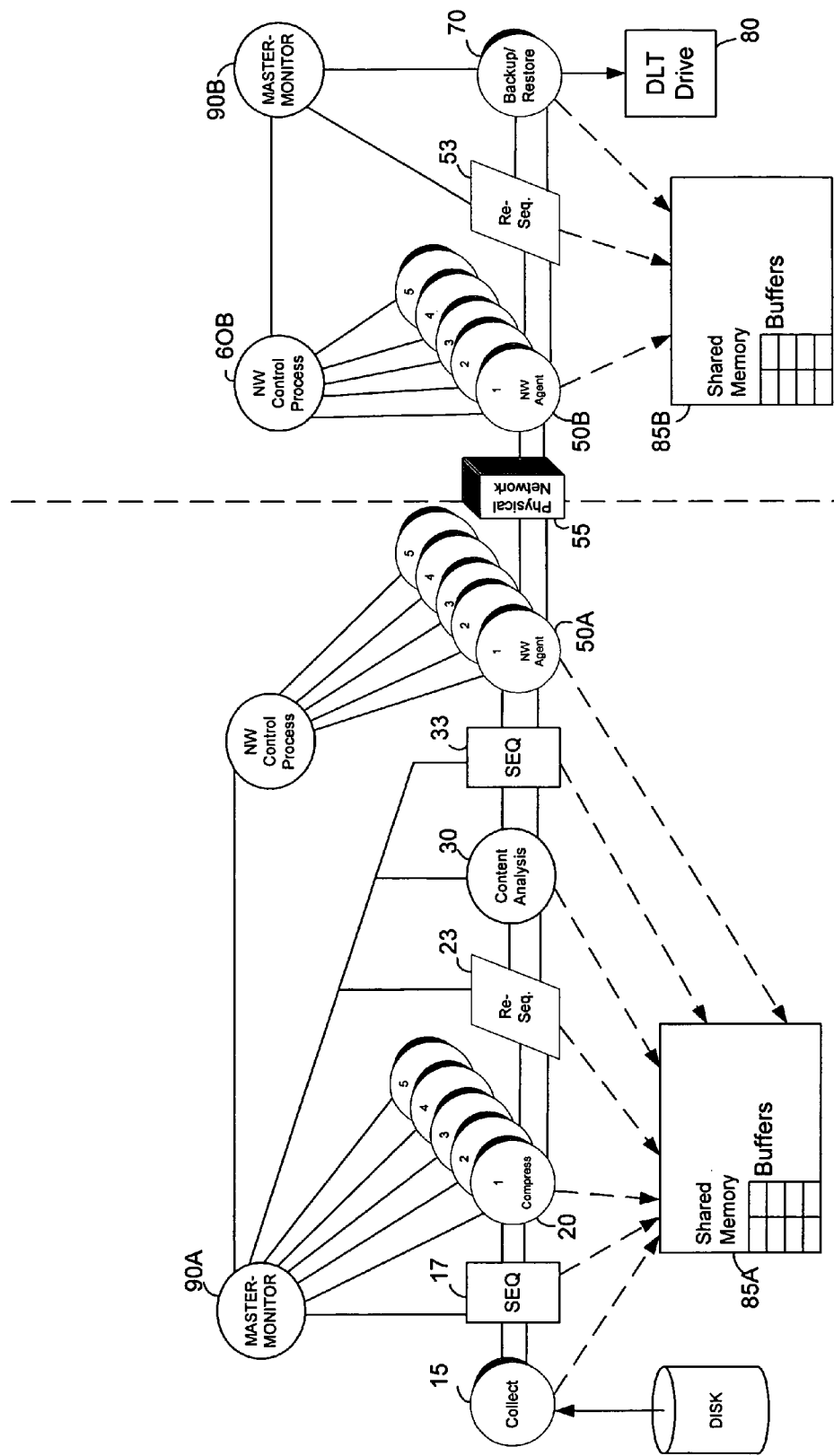
FIG. 7 illustrates a data pipe transfer process on multiple computers having processes with multiple instantiations according to an embodiment of the present invention.

Referring now to FIG. 7, there is shown another embodiment of the DataPipe apparatus as it is used within Vault98 to provide a high speed path between a "client" system containing a large database that is being backed up to the "CommServ" server and stored as archive files on a DLT drive. Everything on the collect side, of the physical network are part of the client software configuration, whereas everything on the DLT drive side of the physical network are part of the server software configuration. The "collect" activities on the client prepare data to be sent over the DataPipe to the CommServ.

FIG. 7, which is similar to FIG. 2B, depicts a two computer configuration where a header task 15, identified as a collect process, is initiated via Master_Monitor daemon 90A on the first computer. Collector 15 retrieves data from the disk and allocates the buffer from the shared memory 85A for processing the data to be transferred. Collector 15 then sends the data to the compression process 20 which functions to compress the data as it moves over the pipe. As shown in FIG. 7, multiple instantiations of compression module 20 are provided at this stage for effectively processing the data as it flows across the system. Accordingly, sequencer 17 initiated by Master_Monitor 90A is coupled directly between collect module 15 and compressor module 20 to stamp each of the buffers with the sequence number as described previously. Re-sequencer module 23 is coupled to the output queue of the compression module 20 instantiations to properly reorder and re-sequence the buffers sent from the instantiations of module 20 to content analysis module 30. Content analysis module 30 then receives the buffers from re-sequencer 23, processes the data, and sends the buffers to sequencer 33, which again stamps the buffers and sends them to multiple instantiations of network agents 50A for processing across the physical network via standard network protocol such as TCP IP, FTP, ICMP etc. Network agents 50B are instantiated by network control processor 60B in communication with remote Master_Monitor 90B to provide multiple network agent instantiations, where each agent on the remote side uniquely corresponds and communicates with corresponding agent on the local side. In the preferred embodiment, each network agent 50A on the local side performs a copy of the data in the buffer for transfer over the physical network to its corresponding network agent 50B on the remote side and then performs a free buffer function call to free the buffers associated with shared memory 85A for reallocation. On the remote side, the network agent 50B receives the data transferred over the network and acts as a header on the remote side to allocate each of the buffers in shared memory 85B. These buffers are then sent to re-sequencer 53 which stores buffers received in internal memory until each of the predecessor buffers are received, and then forwards them to the backup restore process 70 via the SendBuf( ) function. The backup/restore process then functions to write the contents of each of the buffers received to DLT drive 80, and upon completion, frees each of those buffers to permit further reallocation in the buffer pool and shared memory 85B. As one can see, this pipeline could be set up over any high speed network, such as ATM, FDDI, etc. The pipeline is capable of utilizing entire practical bandwidth available on the physical network by means of multiple network agents. In cases where real high speed networks are available (networks which have transfer rates higher than DLT drives), multiple pipelines are set up, to utilize resources available to the full extent.

Salient Features

From the foregoing discussion, numerous advantages of the data pipe pipeline data transfer system using semaphore signaled shared memory to produce a general purpose, flexible data transfer mechanism are apparent. Included among these advantages are:

1. Its flexible nature—the modules that are plugged into a pipeline can be easily changed based on the application.
2. It allows for having multiple instances of a given module running in a given stage of the pipeline. This allows for parallelism over and beyond what the pipeline already provides.
3. It provides a well-defined mechanism for startup and shutdown of a pipeline and includes housekeeping and cleanup mechanisms provided via Master_Monitor.
4. It allows the application control over the amount of network bandwidth it wants to take advantage of. It is easily possible to take complete advantage of a wideband transport mechanism simply by increasing the number of network agents.
5. It provides built-in scheme for fairness among modules. In other words, no single module can retain all the input buffers, or no single instance of a multi-stage module can keep the other instances from operating.
6. It allows easy integration with a 3rd party software by virtue of the fact that the DataPipe provides for any module to attach itself as an unbound end-point (head or tail).
7. It allows for easy check pointing by virtue of a tail-head socket connection.

However, it should be remembered that shared memory on a particular machine is not shared among various other machines. Thus, we are not exploiting implicit results of a distributed shared memory, but doing data transfer, only on a demand basis, discarding all weed buffers, with selective copy, for best performance on a data transfer paradigm. Thus, the invention described herein represents a real data transfer system rather than a commonly seen distributed shared memory paradigm.

Figure 8:
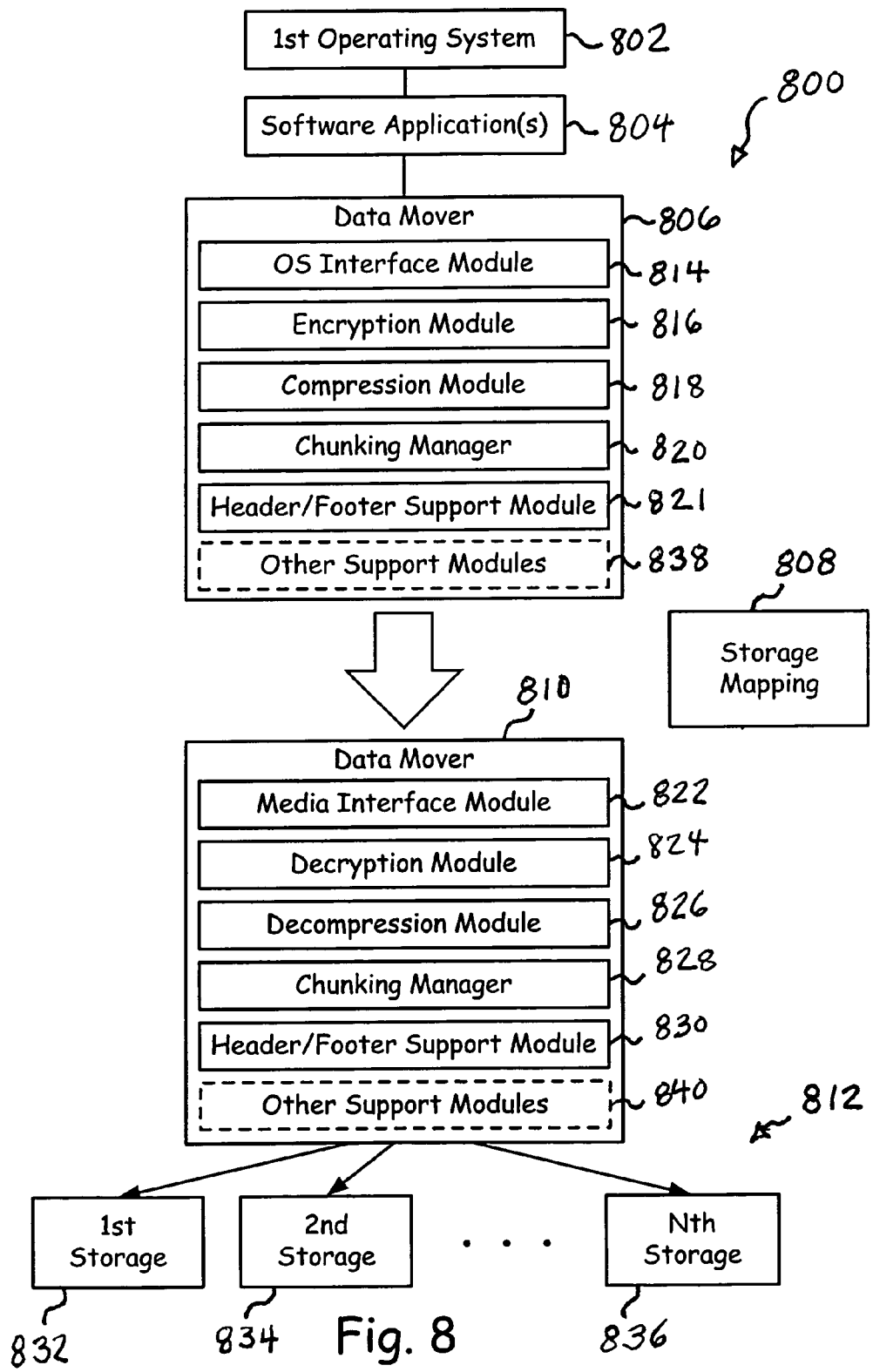
FIG. 8 is a modular data and storage management system that operates according to embodiments of the invention.

FIG. 8 is a modular data and storage management system 800 that operates according to principles of the present invention. A first operating system 802 is illustrated that supports a software application(s) 804 that is used for storing and/or retrieving data. For ease in understanding the principles of the present invention, FIG. 8 is illustrated with data being stored. Initially, data is moved from the software application 804 to a data mover 806 where a storage mapping module 808 is used to determine where the data is to be sent and in what format. The data is then sent to a data mover 810 before it is stored in storage media 812.

The data mover 806 includes an operating system interface module 814 that interacts with an encryption module 816, a compression module 818 and a chunking manager 820. A header/footer support module 821 is used to record information that indicates what format the data has been placed into before moving to the data mover 810. The storage mapping 808 examines the data to determine where it will be sent. In the example of FIG. 8, the data is sent to the data mover 810 where a media interface module 822 interacts with new data that is received at the data mover. The data mover 810 includes a decryption module 824, a decompression module 826, a chunking manager 828, and header/footer module 830. Any one or more of these components may be activated to alter the format of data that has been received at the data mover 810. The data mover 810 then moves the data to the storage media 812, such as a first storage media 832, a second storage media 834, or an nth storage media 836.

As data is moved from the first operating system 802 to the storage media 812, a data pipe is created for passage of the data. For example, the data mover 806 may be considered to create a data pipe between the data mover 806 and the data mover 810. Although the data that is being transmitted could be parsed into multiple chunks by the chunking manager 820, and sent to different types of storage media 812, the data pipe may be considered to be the same data pipe for the data that is being sent. For example, if the data that is to be sent from the first operating system 802 to the storage media 812 is data that begins in a text format, changes to streaming video format, and then to audio format, the data could be separated into chunks which should be stored in different storage media and in different formats. However, the data will be considered to have traveled through a single data pipe. Each chunk of the data that is sent to the storage media 812 causes the storage management system 800 to identify the characteristics of the chunk that has been sent as well as characteristics of the next chunk that is to be sent, thereby allowing the storage management system 800 to keep the data pipe that has been established.

Any portion of the storage management system 800 may select the format for the data. For example, the software application 804 may select whether to encrypt, to compress, or to chunk data that is to be sent. The storage mapping 808 may also be the component that determines whether to encrypt, to compress, or to chunk the data. Also, the data mover 806 may make the decision of whether to encrypt, to compress, or to chunk the data. Numerous other decisions may be made by any one of these three components, such as the type of header, the transmission protocol, or other information necessary to transmit data from the first operating system 802 to the storage media 812.

The data movers 806 and 810 are illustrated having other support modules 838 and 840, respectively. These other support modules 838 and 840 are illustrated in dashed lines to indicate that they may or may not be present.

Figure 9:
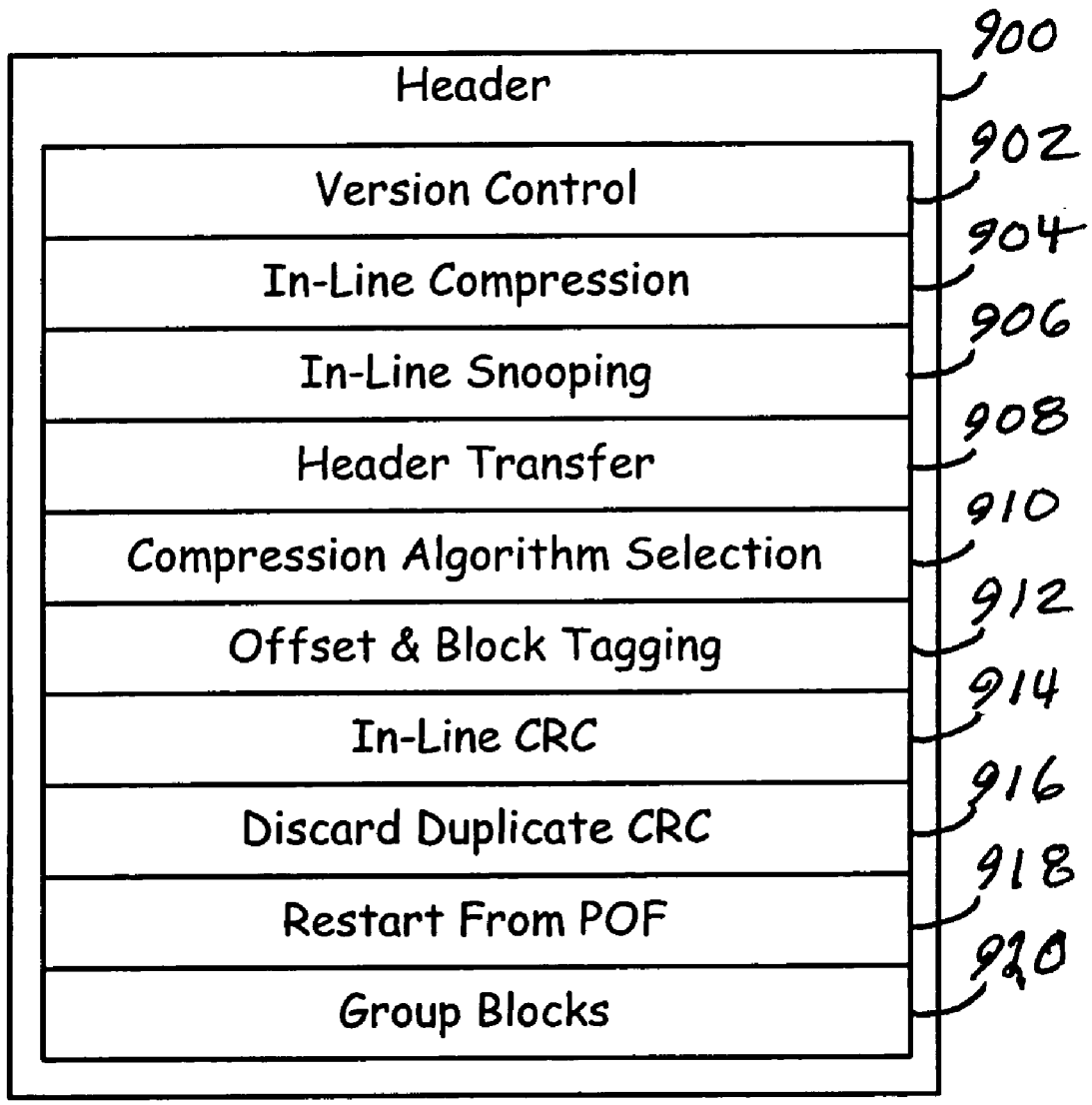
FIG. 9 is an exemplary header that is typically placed at the beginning of chunks of data that are sent across the storage management system.

FIG. 9 is an exemplary header 900 that is typically placed at the beginning of chunks of data that are sent across the storage management system 800. The header 900 includes various pieces of information, such as a version control 902. The version control 902 is on the structure and helps in data format versioning of the data that is being transmitted on the storage management system 800. An in-line compression module 904 is included to assist in the compression of data in the transit of data from one location to the next, and is an optional feature.

Another optional feature is an in-line snooping module 906 that is used for such purposes as anti-virus checking, as well as other security purposes. A header transfer module 908 is included to transfer special headers with the portions of data that include the header 900. A compression algorithm selector 910 is included to select the appropriate compression algorithm for the data that is about to be sent or has just been received. An offset and block tagging module 912 is included for purposes of tagging the offset block number of the data. The block number and offset of the data is useful in determining where to locate data that has been stored. An in-line CRC (cyclic redundancy check) generator 914 may also be included in the i-tag header 900. If the in-line CRC 914 is included, a discard duplicate CRC module 916 may be included for discarding duplicate CRC blocks that have been generated by the in-line CRC 914 generator. Also included is a restart from point of failure (POF) module 918 that is able to continue transmission of data regardless of failures in the transmission. Also, group blocks module 920 can be included to group multiple blocks of data together for more efficient data transfer.

Figure 10:
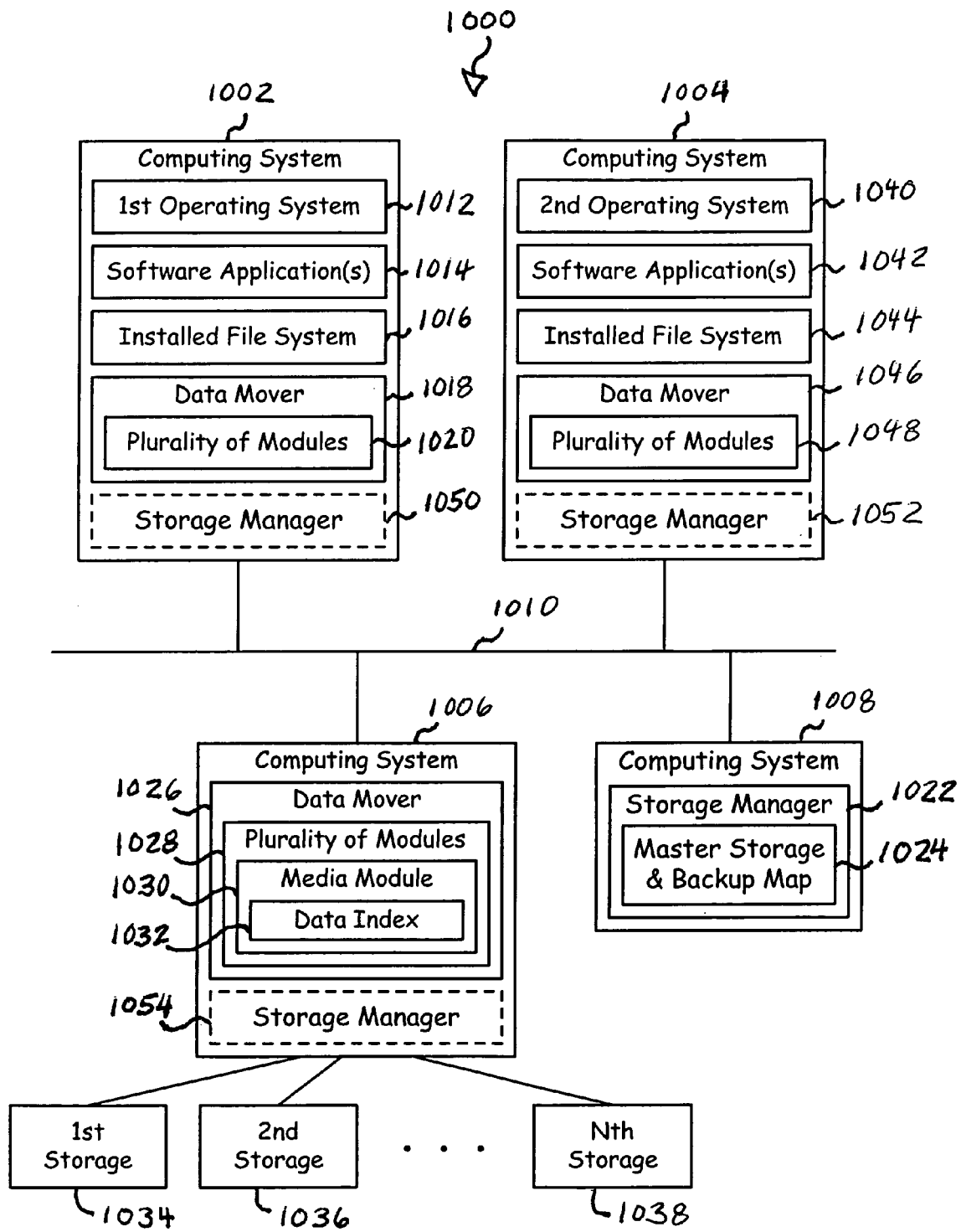
FIG. 10 is an exemplary modular data and storage management system.

FIG. 10 is an exemplary modular data and storage management system 1000. The storage management system 1000 includes computing systems 1002, 1004, 1006, and 1008 that interact across a network 1010, such as an ether net network. The computing system 1002 includes a first operating system 1012 that interacts with software application 1014. The software application 1014 may be a single or multiple applications which interact with an installed file system 1016. When data is to be moved from the computing system 1002, the installed file system 1016 interacts with a data mover 1018 which formats the data into a plurality of modules 1020. The data mover 1018 interfaces with the computing system 1008 to get information from a storage manager 1022 concerning storage location. This information is contained in a master storage and backup map 1024. Upon receipt of the appropriate information from the computing system 1008, the data mover 1018 may transmit the data to the computing system 1006 where it is received at a data mover 1026.

The data mover 1026 includes a plurality of modules 1028, a media module 1030, and a data index 1032. The plurality of modules 1028 allows the data mover 1026 to store the data in a first storage media 1034, a second storage media 1036, down to an nth storage media 1038. The data that is sent from the computing system 1002 to the computing system 1006 may be compressed multiple times before being stored in one of the storage media 1034, 1036, 1038.

In addition, the computing system 1004 may transmit data to be stored. The computing system 1004 has a second operating system 1040, software application(s) 1042, an installed file system 1044, and a data mover 1046, having a plurality of modules 1048. As described in relation to the header 900, data is transmitted in various formats, and various potions of the storage management system may determine which formats to implement for the particular portion of the data transmission.

Of note, the computing systems 1002, 1004, and 1006 may include, as shown in dashed lines, respective storage managers 1050, 1052, and 1054. In this embodiment, the computing system 1008 may no longer be required.

Figure 11:
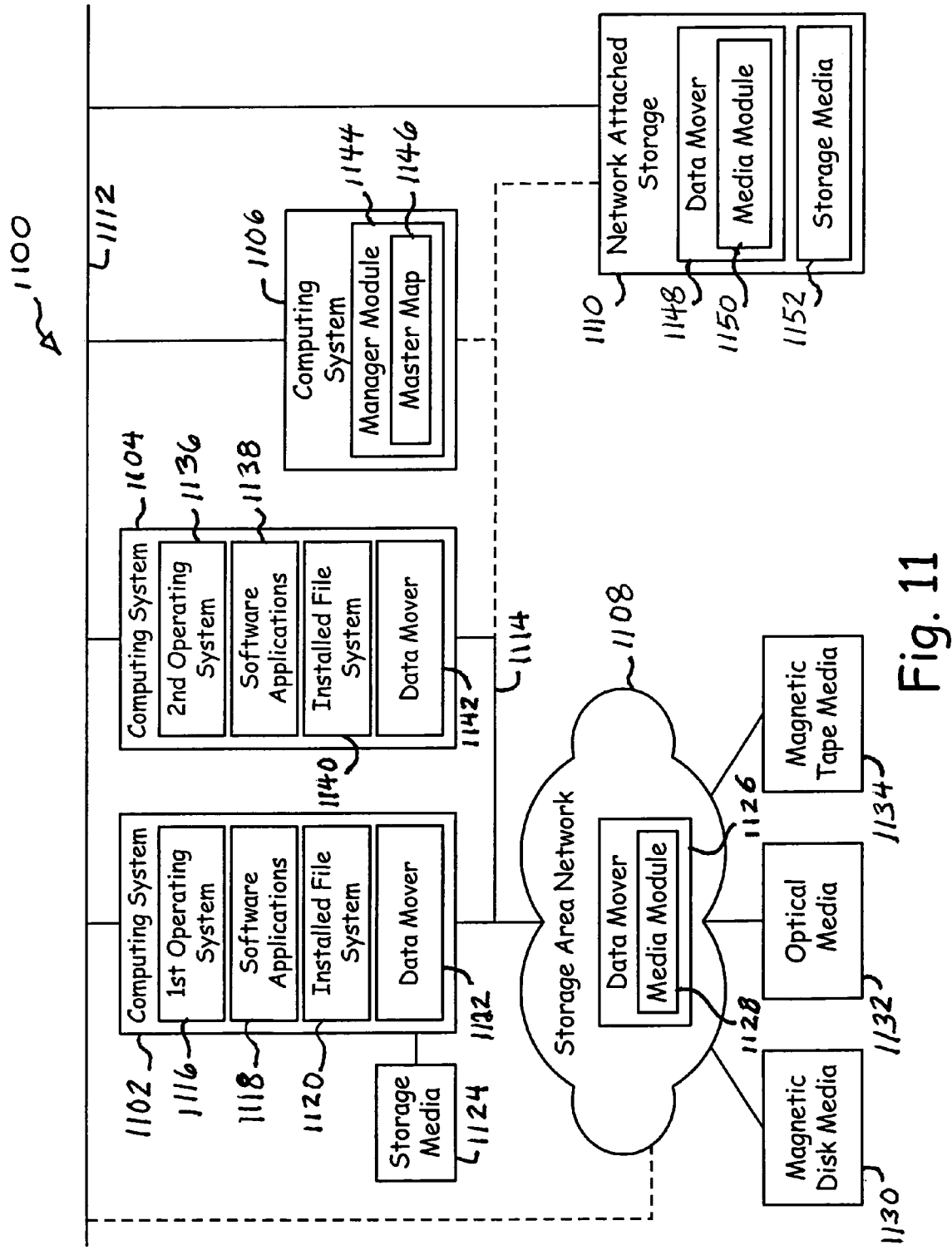
FIG. 11 is an exemplary embodiment of another modular data and storage management system.

FIG. 11 is an exemplary embodiment of another modular data and storage management system 1100. The storage and management system 1100 includes a computing system 1102, a computing system 1104, and a computing system 1106. The computing systems 1102, 1104 and 11106 interact to store data in either a storage area network 1108 or a network attached storage 11110. A network 1112 is provided for communications with the network attached storage 1110, while another network 1114 (typically, a high speed fibre network) is provided for communication with the storage area network 1108. For example, the computing system 1102 may transmit data by using a first operating system 1116 that supports software applications 11118 which interact with an installed file system 1120 to transmit data to a data mover 1122. The data mover 1122 may interact with a storage media 1124 to store data from the computing system 1102. The data mover 1122 may also transmit data to a data mover 1126 of the storage area network 1108. However, in making the decisions to send data to the storage area network 1108, the computing system 1106 is typically accessed to get information from a manager module 1144 to access a master map 1146 for determination for the location of transmission of the data. A media module 1128 of the storage area network 1108 determines whether the data will be saved to a magnetic disk media 1130, an optical media 1132 or a magnetic tape media 1134. In addition, the media module 1128 tracks migration of data between the various storage media 1130, 1132, and 1134.

The computing system 1104 is illustrated as including a second operating system 1136, and software applications 1138 that interact with an installed file system 1140. The installed file system 1140 may receive data from the software applications 1138 and transmit the data to a data mover 1142, where detailed information concerning transmission of the data is found in the computing system 1106 and its manager module 1144 and master map 1146. The data is then transmitted to the network attached storage 1110 where a destination data mover 1148 receives the data, and media module 1150 determines where the data will be stored in a storage media 1152.

As shown in dashed lines, the network 1112 could extend directly to the storage area network 1108. Also shown in dash lines, the network 1114 could extend directly to the network attached storage and the computing system 1106. These variations create greater flexibility in the storage management system 1100 and provide numerous variations to the system. Upon viewing the present disclosure, those skilled in the art will understand that numerous variations are desirable in certain circumstances.

Figure 12:
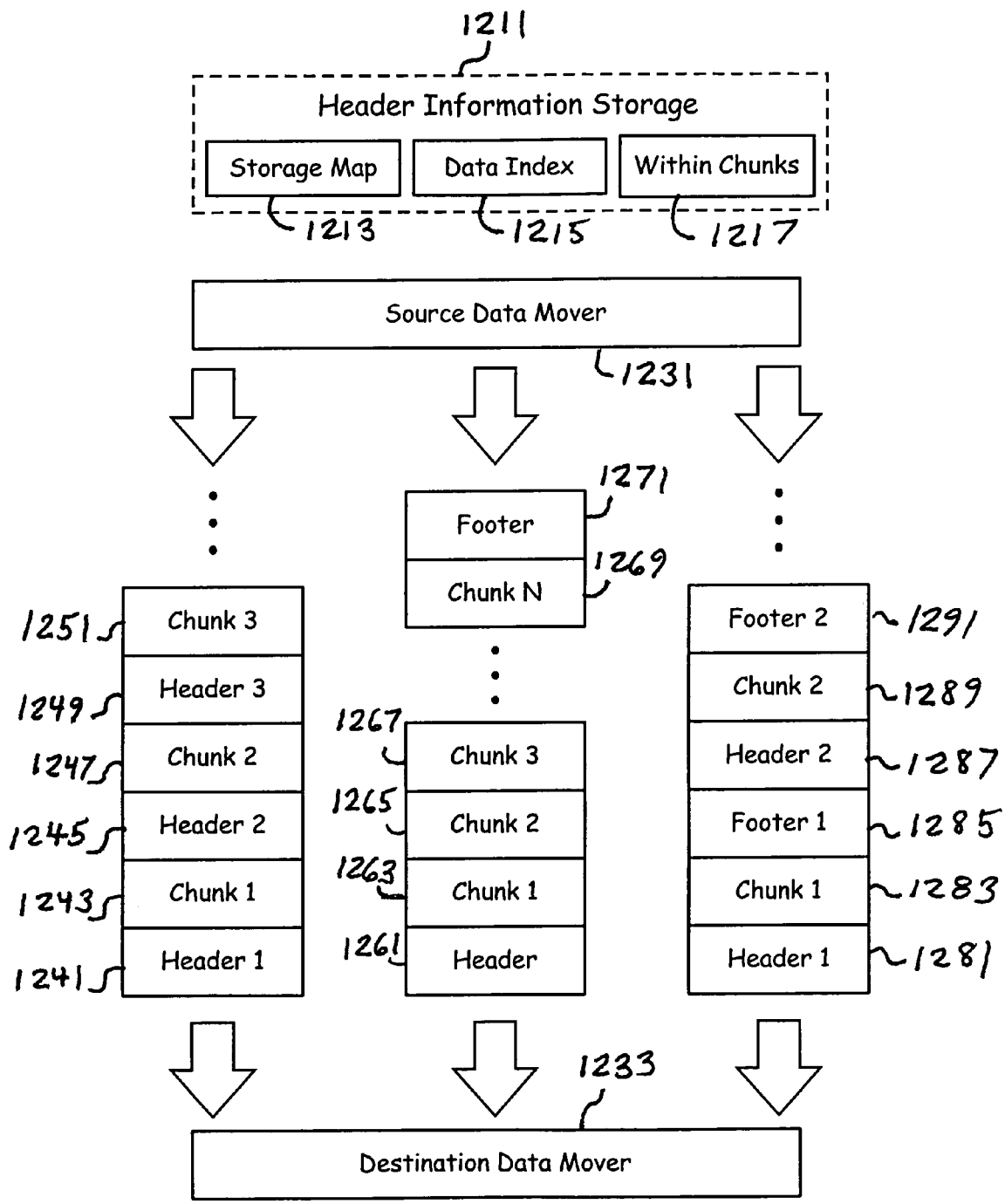
FIG. 12 is an exemplary embodiment of one operational configuration for a header information storage.

FIG. 12 is an exemplary embodiment of one operational configuration for a header information storage 1211. The header information storage 1211 includes a storage map 1213, a data index 1215, and "within chunks" 1217. Each of these portions of the header information storage 1211 may contain different or all of the instructions to move data from a storage data mover 1231 to a destination data mover 1233. Some exemplary methods for transmitting data from the source data mover 1231 to the destination data mover 1233 are illustrated. For example, a header1 1241 could begin a data transmission from the source data mover 1231 to the destination data mover 1233. The header1 1241 would be followed by a chunk1 1243. The chunk1 1243 would then be followed by a header2 1245. The header2 1245 would be followed by a chunk2 1247, which in turn is followed by a header3 1249, which is followed by a chunk3 1251, etc. In this manner, data is transferred to the destination data mover 1233 in chunks until the complete data is received at the destination data mover 1233. The configuration of the headers and chunks is controlled by the header information storage 1211. The detailed information for the data transmission may be found in the storage map 1213, the data index 1215, and the "within chunks" 1217 either separately or collectively.

Another method for transfer of data is where a single header 1261 begins the transmission of multiple chunks, i.e., chunk1 1263, chunk2 1265, chunk3 1267, . . . chunkN 1269. The chunks are followed by a footer 1271 that completes the transmission of the data in this particular embodiment.

Still another method which the header information storage 1211 may use to transmit data is shown by header1 1281, which is followed by chunk1 1283. Chunk1 1283 is then followed by a footer1 1285 to complete transmission of that particular chunk. The next chunk is sent in the same manner, i.e., a header2 1287 is followed by chunk2 1289, which is followed by a footer2 1291 to complete the transmission of a second chunk. This process continues until all chunks have been transmitted to the destination data mover 1233. Of course, the above three methods for transmission of data are exemplary only, and other alternatives could be used for transferring data between the source data mover 1231 and the destination data mover 1233.

Figure 13:
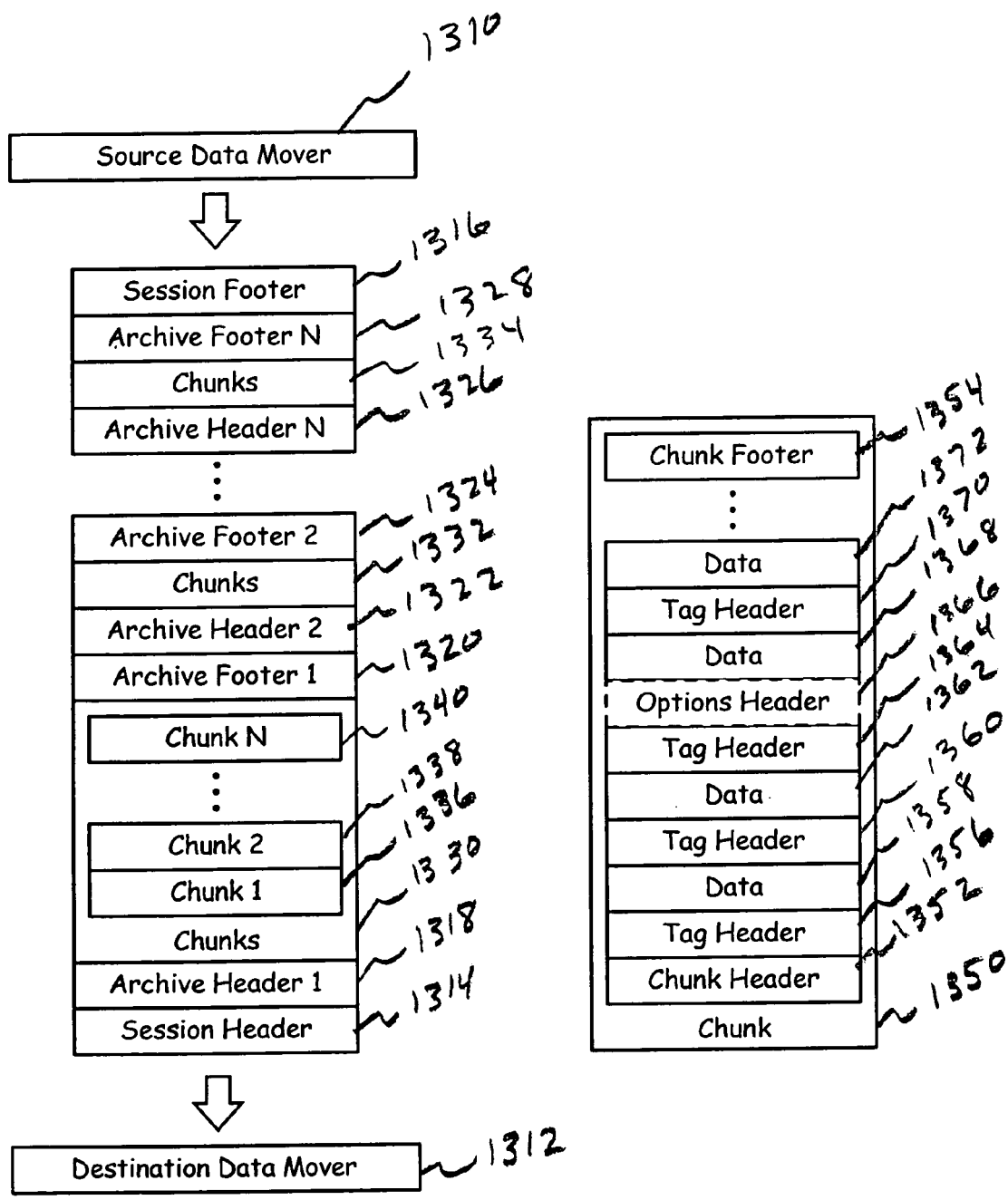
FIG. 13 is an exemplary embodiment of another potential operational configuration for moving data between a source data mover and a destination data mover.

FIG. 13 is an exemplary embodiment of another potential operational configuration for moving data between a source data mover 1310 and a destination data mover 1312. In this embodiment, a data pipe is established, and a session header 1314 is sent from the source data mover 1310 to the destination data mover 1312 to indicate that a pipe should be established between the two. When the pipe is completed, a session footer 1316 is sent from the source data mover 1310 to the destination data mover 1312. In between the session header 1314 and the session footer 1316 are archives, i.e., archive header1 1318 followed by archive footer1 1320, which is followed by archive header2 1322, which is closed when archive footer2 1324 is received, which process continues until archive headerN 1326 is received and archive footerN 1328 is received to establish the completion of the particular archive. Each of the archives is comprised of chunks, as illustrated by chunks 1330, chunks 1332, and chunks 1334.

Chunk 1330 is illustrated as including chunk1 1336, chunk2 1338, . . . chunkN 1340. Each of these individual chunks of the chunk 1330 is illustrated in greater detail to the right, and is represented by chunk 1350.

The chunk 1350 includes a chunk header 1352 and a chunk footer 1354. The chunk header 1352 is followed by a tag header 1356, which is then followed by data 1358. Another tag header 1360 follows the data 1358, and is followed by data 1362 and another tag header 1364. The tag header 1364 is followed by an options header 1366, which includes processing information, such as information indicating that the data should be stored on a different type storage media. The options header 1366 may be the only information following the tag header 1364, but data 1368 is illustrated in the event that other data is to be included after the data header 1364. A tag header 1370 is then illustrated and is followed by data 1372. This process continues until the chunk footer 1354 is sent from the source data mover 1310 to the destination data mover 1312.

While there has been shown preferred embodiments of the present invention, those skilled in the art will further appreciate that the present invention may be embodied in other specific forms without departing from the spirit of central attributes thereof. All such variations and modifications are intended to be within the scope of this invention as defined by the appended claims.

We claim:

1. A method for copying data from a source to a destination using a data pipe, the method comprising:
   identifying at least a first characteristic of a first portion of the data;
   identifying at least a second characteristic of a second portion of the data;
   copying the first portion of the data through the data pipe in a first chunk in a first format based on the first characteristic;
   generating a first header describing the contents of the first chunk, the first header including information relating to at least a first storage operation to be performed on the first chunk;
   copying the second portion of the data through the data pipe in a second chunk in a second format based on the second characteristic, the second format being distinct from the first format; and
   generating a second header describing the contents of the second chunk, the second header including information relating to at least a second storage operation to be performed on the second chunk.

2. The method as recited in claim 1, further comprising:
   sending the first chunk with the first header to a first destination; and
   sending the second chunk with the second header to a second destination.

3. The method as recited in claim 2, wherein:
   the first header indicates where to store the first chunk; and
   the second header indicates where to store the second chunk.

4. The method as recited in claim 2 further comprising:
   creating a first data pipe for sending the first chunk to the first destination; and
   creating a second data pipe for sending the second chunk to the second destination.

5. The method as recited in claim 4 wherein the first data pipe is created based at least on the first characteristic; and the second data pipe is created based at least on the second characteristic.

6. The method as recited in claim 4 wherein the first data pipe and the second data pipe are created based at least on the respective destination.

7. The method as recited in claim 3, further comprising:
   storing the first chunk in a first storage medium in the first format; and
   storing the second chunk in a second storage medium in the second format, the second storage medium being distinct from the first storage medium.

8. The method as recited in claim 1, further comprising:
   performing the first storage operation on the first chunk; and
   performing the second storage operation on the second chunk.

9. The method as recited in claim 8 wherein the first storage operation and the second storage operation comprise a back up operation.

10. The method as recited in claim 8 wherein the first storage operation and the second storage operation comprise an archive operation.

11. The method as recited in claim 1 wherein the first characteristic comprises a data type.

12. A method for copying data from a first storage device to a second storage device, the method comprising:
   obtaining data from a first storage device;
   parsing the data into at least a first chunk and a second chunk, said parsing being based on a first characteristic of the data in the first chunk and a second characteristic of the data in the second chunk;
   generating a first header for the first chunk, the first header being indicative of a first storage operation to be performed on the first chunk;
   generating a second header for the second chunk, the second header being indicative of a second storage operation to be performed on the second chunk;

sending the first header and the first chunk in a first format over a network to a first storage destination; and sending the second header and the second chunk in a second format over the network to a second storage destination.

13. The method of claim 12, additionally comprising:

storing the first chunk in the first format in the first storage destination; and storing the second chunk in the second format in the second storage destination, wherein the first format is different than the second format.

14. The method of claim 13, wherein the first storage destination is on a first storage medium and the second storage destination is on a second storage medium different from the first storage medium.

15. The method of claim 12, wherein the first storage operation comprises a back up operation or an archive operation.

16. The method of claim 15, wherein the second storage operation is different than the first storage operation.

17. A system for transferring data between a source storage device and multiple destination storage devices, the system comprising:

a source storage device configured to store a piece of data;

a plurality of destination storage devices;

a first data mover module comprising:

a parsing module configured to divide the piece of data into a plurality of chunks based on different characteristics of the data, a header module configured to generate and associate a header with each of the plurality of chunks, each header comprising information regarding a storage operation to be performed on the associated chunk, and a interface module configured to transmit the plurality of chunks over a network; and a second data mover module coupled to the network and configured to receive the plurality of chunks from the network, the second data mover module being further configured to send the plurality of chunks to the plurality of destination storage devices based on the storage operation information stored in each header.

18. The system of claim 17, wherein the first data mover module is configured to dynamically establish a plurality of data pipes with the second data mover module, each of the plurality of data pipes being configured to transfer at least one of the plurality of chunks between the first data mover module and the second data mover module.

19. The system of claim 17, wherein the interface module comprises a plurality of network agents that are dynamically assignable by the first data mover module to transfer the plurality of chunks based on an available bandwidth of the network.

20. The system of claim 19, wherein the plurality of destination storage devices comprises different types of storage media.

* * * * *